(12) United States Patent
Egerstedt et al.

(10) Patent No.: US 10,537,996 B2
(45) Date of Patent: Jan. 21, 2020

(54) CONTROL OF SWARMING ROBOTS

(71) Applicant: Georgia Tech Research Corporation, Atlanta, GA (US)

(72) Inventors: Magnus Egerstedt, Atlanta, GA (US); Sung Gun Lee, Atlanta, GA (US); Yancy Diaz-Mercado, Atlanta, GA (US); Smriti Chopra, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 15/309,146

(22) PCT Filed: May 5, 2015

(86) PCT No.: PCT/US2015/029211
§ 371 (c)(1),
(2) Date: Nov. 4, 2016

(87) PCT Pub. No.: WO2015/171593
PCT Pub. Date: Nov. 12, 2015

(65) Prior Publication Data
US 2017/0072565 A1    Mar. 16, 2017

Related U.S. Application Data

(60) Provisional application No. 61/988,345, filed on May 5, 2014, provisional application No. 61/988,817, filed on May 5, 2014.

(51) Int. Cl.
*B25J 9/16*    (2006.01)
(52) U.S. Cl.
CPC ... *B25J 9/1682* (2013.01); *G05B 2219/39153* (2013.01)

(58) Field of Classification Search
CPC ......... B25J 9/1682; B25J 9/1664–1669; B25J 9/1674–1676; G05B 2219/39153;
(Continued)

(56) References Cited

U.S. PATENT DOCUMENTS

| | | | |
|---|---|---|---|
| 6,507,771 B2 * | 1/2003 | Payton | G05D 1/0242 318/568.1 |
| 2007/0156286 A1 | 7/2007 | Yamauchi | |

(Continued)

FOREIGN PATENT DOCUMENTS

| | | |
|---|---|---|
| JP | 1998040055 | 2/1998 |
| JP | 2004505338 | 2/2004 |
| WO | 02-08843 | 1/2002 |

OTHER PUBLICATIONS

International Search Report and Written Opinion for related International Patent Application No. PCT/US2015/029211, dated Sep. 29, 2015.

(Continued)

*Primary Examiner* — Bao Long T Nguyen
(74) *Attorney, Agent, or Firm* — Troutman Sanders LLP; Ryan A. Schneider

(57) ABSTRACT

Systems and methods for controlling a swarm of mobile robots are disclosed. In one aspect, the robots cover a domain of interest. Each robot receives a density function indicative of at least one area of importance in the domain of interest, and calculates a velocity vector based on the density function and a displace vector relative to an adjacent robot. Each robot moves to the area of importance according to its velocity vector. In some aspects, the robots together perform a sequence of formations. Each robot mimics a trajectory as part of its performance by switching among a plurality of motion modes. Each robot determines its next motion mode based on a displacement vector relative to an adjacent robot.

19 Claims, 15 Drawing Sheets

(58) Field of Classification Search
CPC ........ G05B 19/418; G05B 2219/39146; G05B 2219/39163; G05D 1/0287–0289; G06G 7/78; G06T 13/80; B64C 2201/143; Y10S 901/08
See application file for complete search history.

(56) References Cited

U.S. PATENT DOCUMENTS

| | | | |
|---|---|---|---|
| 2009/0015404 A1* | 1/2009 | Lin | B25J 9/1674 340/540 |
| 2009/0030551 A1 | 1/2009 | Hein et al. | |
| 2011/0035052 A1 | 2/2011 | McLurkin et al. | |
| 2011/0304633 A1* | 12/2011 | Beardsley | B25J 9/1666 345/474 |
| 2012/0206473 A1* | 8/2012 | Beardsley | B25J 9/1666 345/582 |
| 2013/0184865 A1 | 7/2013 | Guo et al. | |
| 2016/0124558 A1* | 5/2016 | Karazhov | G06T 11/20 345/173 |

OTHER PUBLICATIONS

Extended European Search Report from EP application No. 15789142.5 dated May 3, 2018 (13 pages).
Falconi, et al., "Graph Based Distributed Control of Non-Holonomic Vehicles Endowed with Local Positioning Information Engaged in Escorting Missions," 2010 IEEE International Conference on Robotics and Automation, May 3-8, 2010, Anchorage, Alaska, pp. 3207-3214.
Pugh, et al., "A Fast Onboard Relative Positioning Module for Multirobot Systems," IEEE/ASME Transactions on Mechatronics, Apr. 2009, vol. 14 (2) pp. 151-162.
Lee, et al., "Multi-Robot Control Using Time-Varying Density Functions," Apr. 1, 2014 IEEE Transactions on Robotics pp 1-8.
Office Action from Japanese application No. 2016-567027 dated Mar. 15, 2019 (English machine translation—3 pages).

* cited by examiner

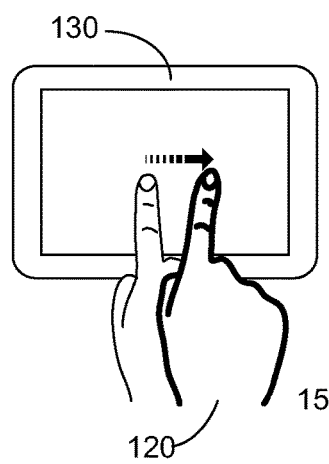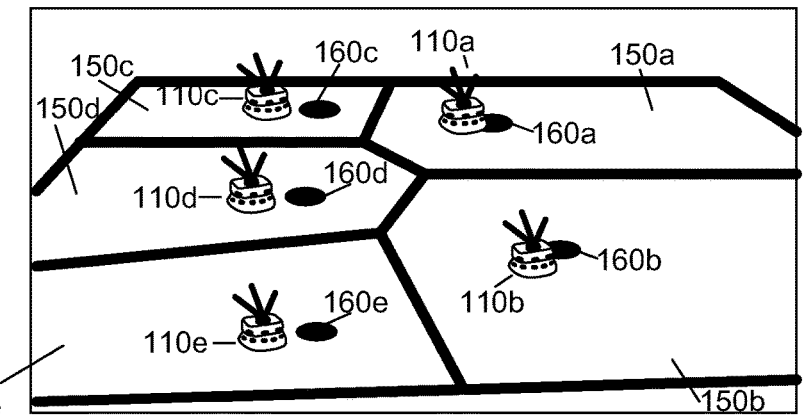
(a)
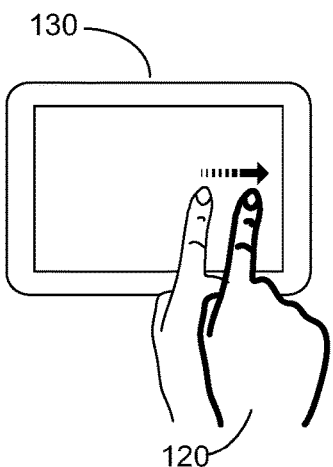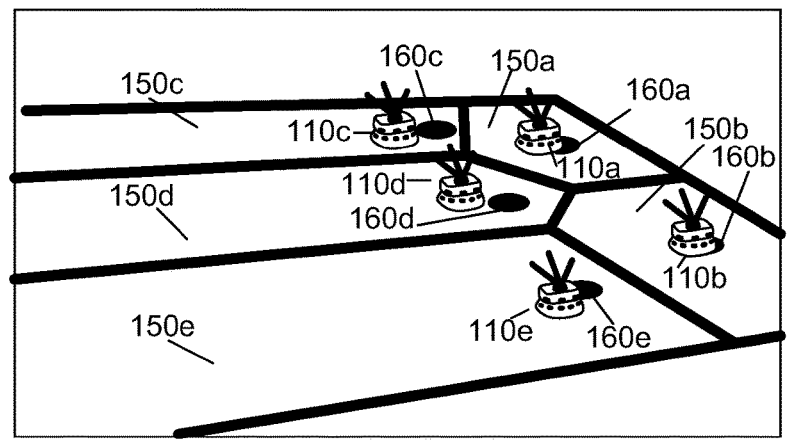
(b)
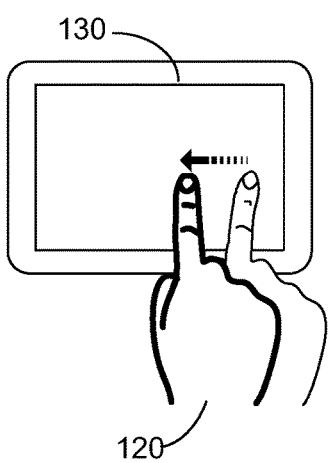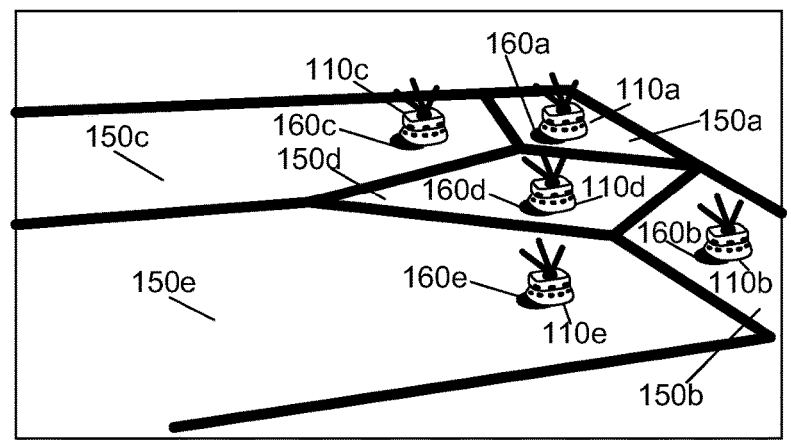
(c)
FIG. 7

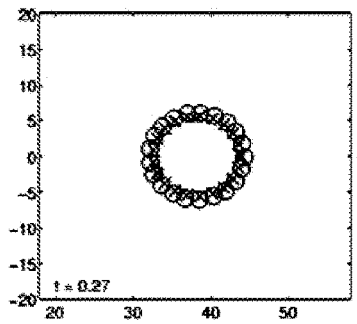
(a) Circle expands outwards

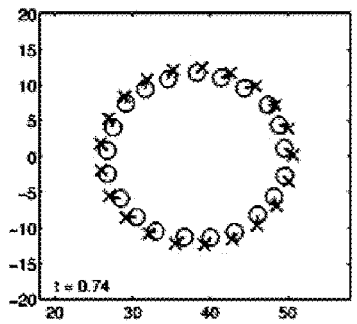
(b) Circle spirals inwards

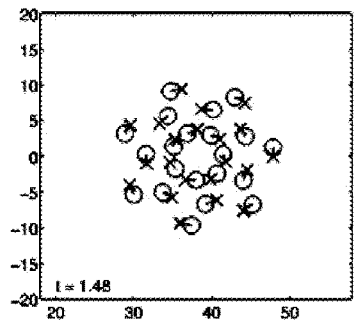
(c) Circle rotates in different directions

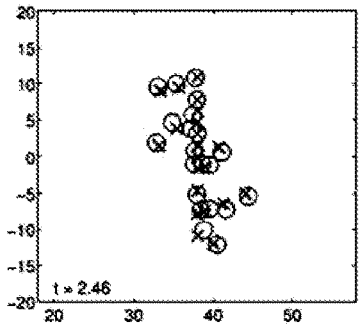
(d) Circle break to form line

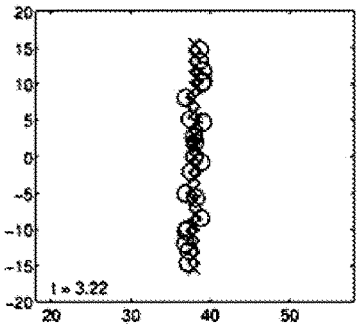
(e) Agents form a vertical line

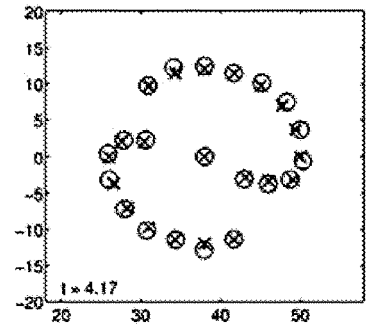
(f) Line unravels to circle with center

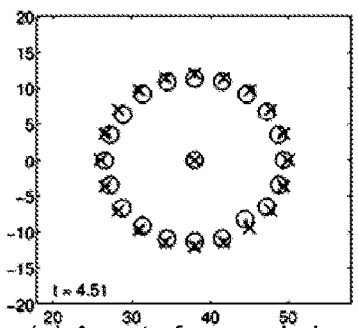
(g) Agents form a circle with center

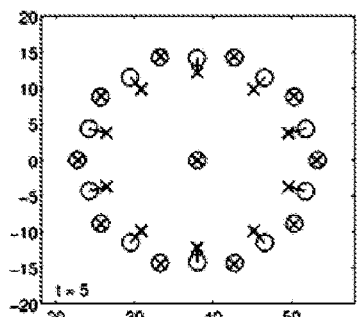
(h) Certain agents expand outwards

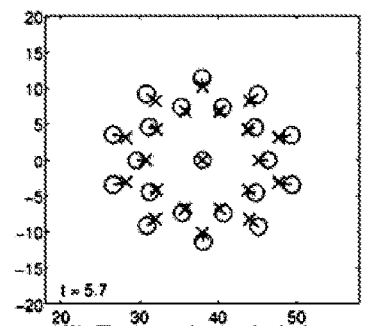
(i) Formation shrinks towards center

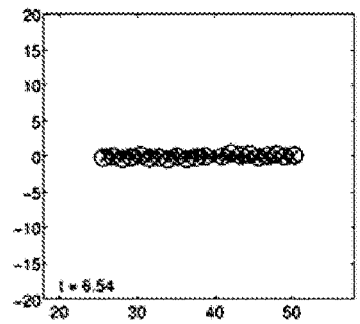
(j) Agents form a horizontal line

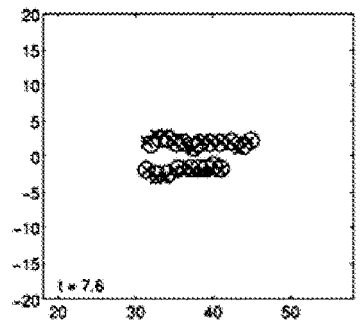
(k) Agents split into two groups

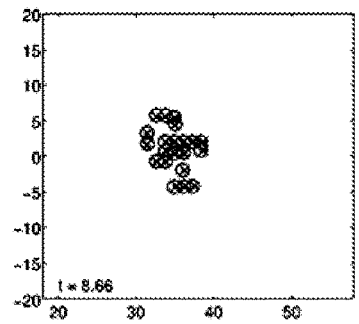
(l) Agents form a GT logo

FIG. 12

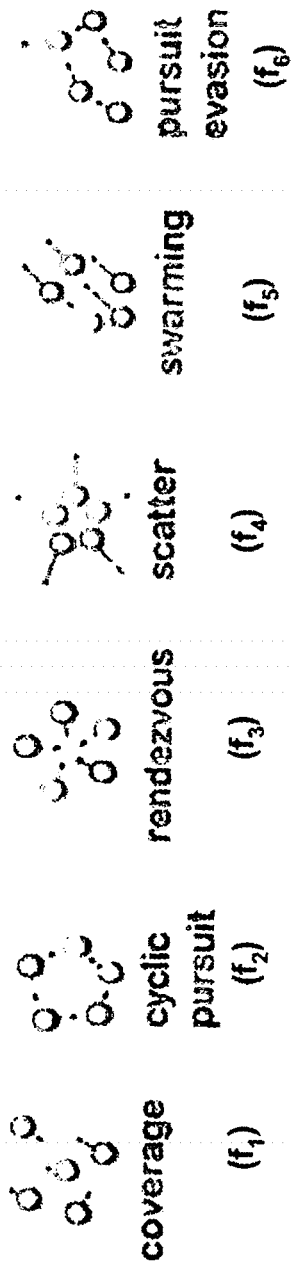
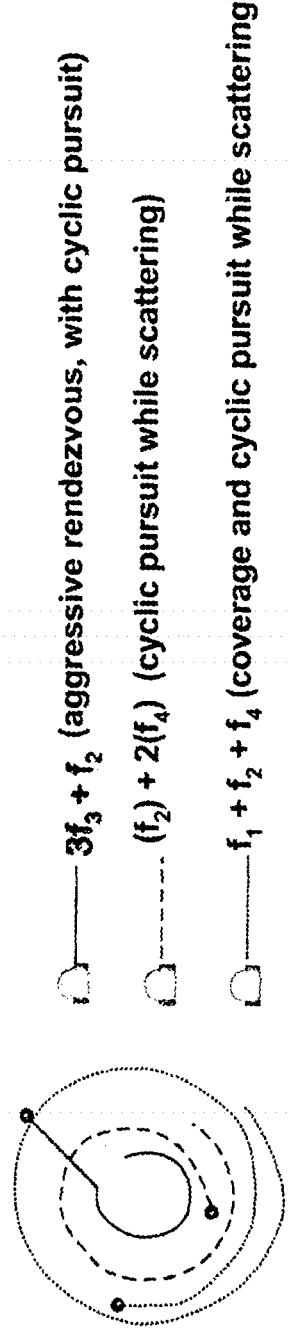
FIG. 14

CONTROL OF SWARMING ROBOTS

CROSS-REFERENCE TO RELATED APPLICATIONS

This application is a U.S. National Stage of International Patent Application No. PCT/US2015/029211, filed 5 May 2015, which claims the benefit of U.S. Provisional Patent Application Ser. No. 61/988,345, entitled "Density-Based Manipulation of Teams of Robots," filed on May 5, 2014, and U.S. Provisional Patent Application Ser. No. 61/988,817, entitled "Adaptive Interactions for Swarming Robots," filed on May 5, 2014, the entire contents and substance of which are incorporated herein by reference in their entirety as if fully set forth below.

TECHNICAL FIELD DISCLOSED

Embodiments of the disclosed technology generally relate to multi-robot or multi-agent control. More particularly, the disclosed technology relates to control of a swarm of robots using time-varying density functions. The disclosed technology also relates to control of a swarm of robots to perform a sequence of formations.

BACKGROUND DISCLOSED

Coverage control is one area of multi-robot or multi-agent control that has received significant attentions. Coverage control is concerned with how to position robots in such a way that "surveillance" of a domain of interest is maximized, where areas of importance within the domain of interest are associated with a density function. The focus of existing coverage algorithms have largely been on static density functions, which does not provide a flexible solution for a dynamically changing environment, for example, when the areas of importance within the domain of interest change. Also, in the existing coverage algorithms, each robot knows the positions of all robots in the multi-robot system. As a result, the existing system may be prone to crash when handling a large number of robots.

To date, relatively little work has been done on coverage with time-varying density functions. In J. Cortes, S. Martinez, T. Karatas, and F. Bullo, "Coverage control for mobile sensing networks: Variations on a theme," in Mediterranean Conference on Control and Automation, Lisbon, Portugal, 2002, Electronic Proceedings, the time-varying case was investigated under a set of simplifying assumptions on the density functions. However, those assumptions do not hold in general and their violations may even cause the algorithm to break down. Another stab at the problem was pursued in L. C. A. Pimenta, M. Schwager, Q. Lindsey, V. Kumar, D. Rus, R. C. Mesquita, and G. A. S. Pereira, "Simultaneous coverage and tracking (scat) of moving targets with robot networks." in WAFR, ser. Springer Tracts in Advanced Robotics, vol. 57. Springer, 2008, pp. 85-99, where time-varying density functions were used as a means to track moving targets. However, formal guarantee of achieving coverage were absent from these existing attempts.

There is a need for a reliable, robust and flexible solution with optimal coverage when human operators wish to adaptively interact with a team of robots through a dynamic re-shaping of the density functions. There is also a need for an optimal control solution for a multi-robot switched autonomous system.

BRIEF SUMMARY DISCLOSED

The disclosed technology relates to controlling a swarm of robots. One aspect of the disclosed technology relates to a multi-robot system for covering a domain of interest. The system may include a plurality of mobile robots together covering the domain of interest. Each robot may include a memory storing data representative of the domain of interest. Each robot may include a sensor for detecting relative distance and angle measurements of an adjacent robot. Each robot may include a processor coupled to the sensor. The processor may receive from the sensor data representative of the relative distance and angle measurements of the adjacent robot. The processor may determine a displacement vector relative to the adjacent robot based on the relative distance and angle measurements detected by the sensor. The processor may receive data representative of a density function indicative of at least one area of importance in the domain of interest. The processor may calculate a velocity vector based on the density function and the displacement vector relative to the adjacent robot. The processor may output for moving the robot to the at least one area of importance in the domain of interest based on the velocity vector.

Another aspect of the disclosed technology relates to a method for controlling a multi-robot system. The system may have a plurality of mobile robots to cover a domain of interest. A processor on each robot may receive, from a sensor, data representative of the relative distance and angle measurements of an adjacent robot. The processor may determine a displacement vector relative to the adjacent robot based on the relative distance and angle measurements detected by the sensor. The processor may receive data representative of a density function indicative of at least one area of importance in the domain of interest. The processor may calculate a velocity vector based on the density function and the displacement vector relative to the adjacent robot. The processor may output for moving the robot to the at least one area of importance in the domain of interest based on the velocity vector.

Yet another aspect of the disclosed technology relates to a multi-robot system for performing a sequence of formations. The system may include a plurality of mobile robots together performing the sequence of formations. Each robot may mimic a trajectory as part of its performance. Each robot may mimic the trajectory by switching among a plurality of motion modes. Each robot may include a sensor for detecting relative distance and angle measurements of an adjacent robot. Each robot may also include a processor coupled to the sensor. The processor may be configured to receive data representative of the sequence of formations. The processor may determine a displacement vector relative to the adjacent robot based on the relative distance and angle measurements detected by the sensor. The processor may determine a scaling factor for the robot's next mode based on the displacement vector. The processor may determine a rotation factor for the robot's next mode based on the displacement vector. The processor may determine a switch time for the robot's next mode based on the displacement. The processor may output for executing the next mode based on the scaling factor, the rotation factor and the switch time.

A further aspect of the disclosed technology relates to a method for controlling a multi-robot system. The multi-robot system may have a plurality of robots. The method may control the robots to perform a sequence of formations in a decentralizing manner. Each robot may mimic a trajectory as part of its performance. Each robot may mimic the trajectory by switching among a plurality of motion modes. A processor on each robot may receive data representative of the sequence of formations. The processor may receive, from a sensor, data representative of relative distance and angle measurements between the robot and its adjacent robot. The processor may determine a displacement vector relative to the adjacent robot based on the relative distance and angle measurements. The processor may determine a scaling factor for the robot's next mode based on the displacement vector. The processor may determine a rotation factor for the robot's next mode based on the displacement vector. The processor may determine a switch time for the robot's next mode based on the displacement. The processor may output for executing the next mode based on the scaling factor, the rotation factor and the switch time.

These and other aspects of the disclosed technology are described in the Detailed Description disclosed below and the accompanying figures. Other aspects and features of embodiments of the disclosed technology will become apparent to those of ordinary skill in the art upon reviewing the following description of specific, exemplary embodiments of the disclosed technology in concert with the figures. While features of the disclosed technology may be discussed relative to certain embodiments and figures, all embodiments of the disclosed technology can include one or more of the features discussed herein. While one or more embodiments may be discussed as having certain advantageous features, one or more of such features may also be used with the various embodiments of the disclosed technology discussed herein. In similar fashion, while exemplary embodiments may be discussed below as system or method embodiments, it is to be understood that such exemplary embodiments may be implemented in various devices, systems, and methods of the disclosed technology.

BRIEF DESCRIPTION OF THE DRAWINGS

The following Detailed Description technology is better understood when read in conjunction with the appended drawings. For the purposes of illustration, there is shown in the drawings exemplary embodiments, but the subject matter is not limited to the specific elements and instrumentalities disclosed.

FIG. 12(a)-(l) illustrates simulation of optimally decentralized version of a drumline-inspired dance with multiple robots in accordance with one aspect of the disclosed technology.

FIG. 14 illustrates a pictorial example of scripting language in accordance with one aspect of the disclosed technology.

DETAILED DESCRIPTION

Figure 1:
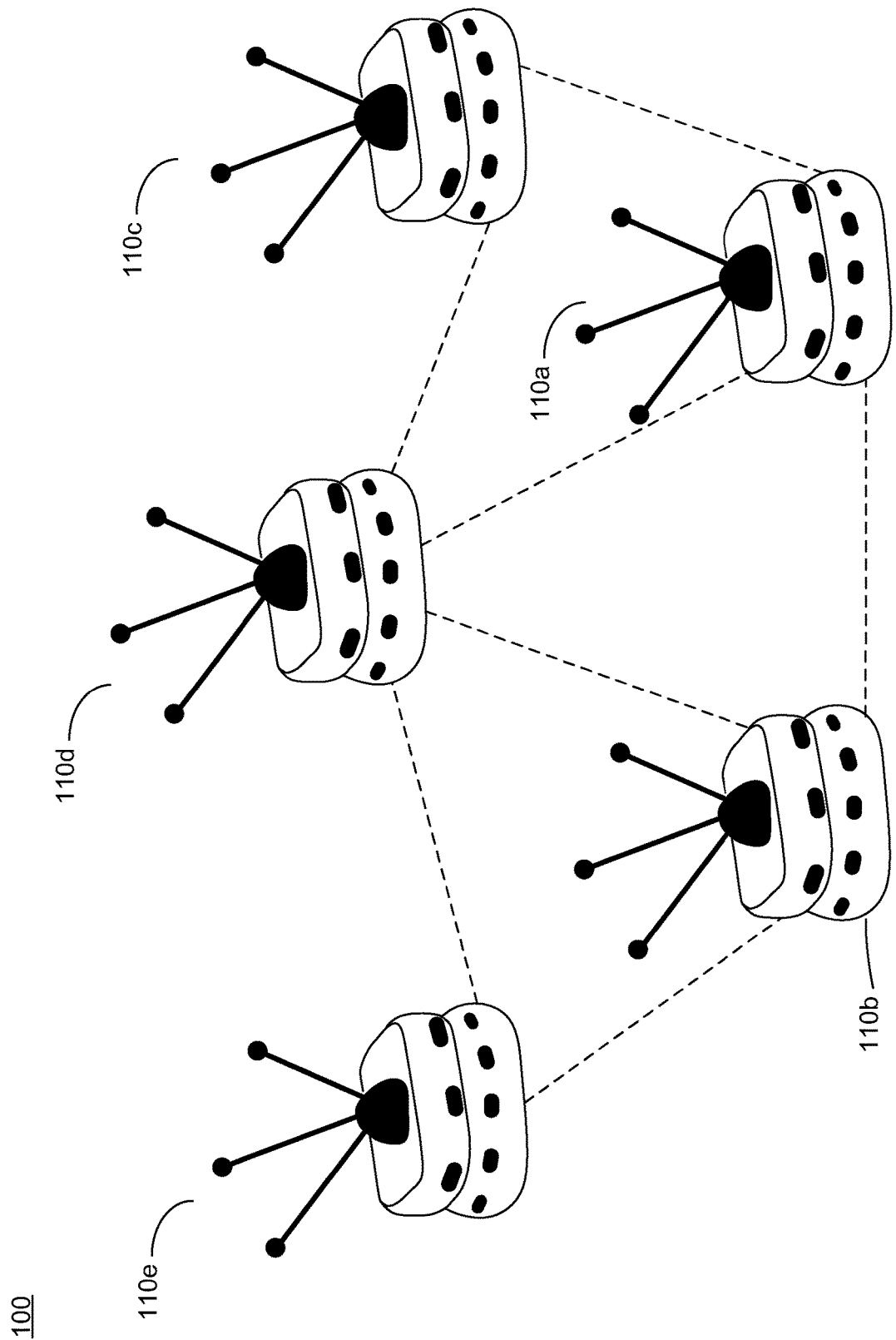
FIG. 1 provides a schematic illustration of a multi-robot network in accordance with one aspect of the disclosed technology.

To facilitate an understanding of the principles and features of the various embodiments of the present invention, various illustrative embodiments are explained below. Although exemplary embodiments of the present invention are explained in detail, it is to be understood that other embodiments are contemplated. Accordingly, it is not intended that the present invention is limited in its scope to the details of construction and arrangement of components set forth in the following description or examples. The present invention is capable of other embodiments and of being practiced or carried out in various ways. Also, in describing the exemplary embodiments, specific terminology will be resorted to for the sake of clarity.

It must also be noted that, as used in the specification and the appended claims, the singular forms "a," "an" and "the" include plural references unless the context clearly dictates otherwise. For example, reference to a component is intended also to include composition of a plurality of components. References to a composition containing "a" constituent is intended to include other constituents in addition to the one named.

Also, in describing the exemplary embodiments, terminology will be resorted to for the sake of clarity. It is intended that each term contemplates its broadest meaning as understood by those skilled in the art and includes all technical equivalents that operate in a similar manner to accomplish a similar purpose.

Ranges may be expressed herein as from "about" or "approximately" or "substantially" one particular value and/or to "about" or "approximately" or "substantially" another particular value. When such a range is expressed, other exemplary embodiments include from the one particular value and/or to the other particular value.

Similarly, as used herein, "substantially free" of something, or "substantially pure", and like characterizations, can include both being "at least substantially free" of something, or "at least substantially pure", and being "completely free" of something, or "completely pure".

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a composition does not preclude the presence of additional components than those expressly identified. Such other components or steps not described herein can include, but are not limited to, for example, similar components or steps that are developed after development of the disclosed technology.

The materials described as making up the various elements of the present invention are intended to be illustrative and not restrictive. Many suitable materials that would perform the same or a similar function as the materials described herein are intended to be embraced within the scope of the present invention. Such other materials not described herein can include, but are not limited to, for example, materials that are developed after the time of the development of the present invention.

1. Multi-Robot Network

FIG. 1 illustrates a multi-robot network 100. The network 100 may include at least two robots 110 spatially distributed. Each robot 110 may also be known as an agent. The network 100 may include hundreds or thousands of robots 110. In the example as illustrated in FIG. 1, the network 100 may include robots 110a-e. Each robot may be a mobile robot, such as a wheeled ground robot. For instance, each robot may be a differential-drive robot, such as a Khepera III differential-derive mobile robot from K-team.

Robots may collaborate with each other to collectively complete one or more tasks. Each robot may have different capabilities. The robots may negotiate among themselves to accomplish the tasks. The robots may assemble as a team, into the most efficient positions, relative to each other. Each robot may include pre-programmed algorithms in its controlling software which serves as the language that each robot uses to define and solve problems as a group.

In one example, a Robot Operating System (ROS) framework running on an Ubuntu machine with a processor and memory may be used to implement the algorithm. The Ubuntu machine may be a smart phone, tablet or any computing device. The Ubuntu machine may have a version of 11.04. The processor may be an Intel dual core CPU 2.13 GHz. The memory may be 4 GB. The ROS may have a version of Diamondback. The ROS may send control signals to individual robots over a wireless router. Each robot may have a processor, embedded Linux, differential drive wheels, and a wireless card for communication over a wireless router. The processor on each robot may be 600 MHz ARM with 128 Mb RAM. The processors of the robots may have clocks that can be synchronized and remain synchronized for a period of time afterwards. The robots may communicate with one another wirelessly with built-in sensors. Using the pre-programmed algorithms in the software, the robots may know their roles and communicate with each other wirelessly.

Each robot may not know the entire universe of the robots in the network 100. Each robot may not have a have Global Positioning System thereon, and thus may not have or know the global coordinates. However, each robot may have a sensor. The sensor may measure a relative displacement of adjacent robots in real-time. The sensor on a robot may detect adjacent robots within a close proximity (also known as neighbors). The robot may move to a center of its local neighborhood. The robot may determine its new position based on its local neighborhood. For example, the robot's new position may be calculated as a function of distance between adjacent robots. For instance, with reference to FIG. 1, if a robot 110a is too far from an adjacent robot 110b, then the robot 110a may move closer to the adjacent robot 110b. On the other hand, if the robot 110a is too close to the adjacent robot 110b or collide into the adjacent robot 110b, then the robot 110a may move away from the robot 110b.

The sensing technology implemented by the robots may be LIDAR or vision-based sensing. For instance, each robot may include at least a motion capture camera to provide real-time position and orientation data for the robot. In some instances, each robot may include two motion capture cameras. The motion capture camera may be an Optitrack S250e motion capture camera.

Based on the relative distance and angle between itself and each of its neighbors, each robot may perform simple operations on these vectors such as scaling and rotation. Scaling of the relative displacement vector may refer to multiplying the relative distance measurement by a constant. Rotating the relative displacement vector may be performed by adding a constant to the relative angle measurement. The scaled and rotated displacement vectors may also be added together using vector addition.

The control of the robots in the network 100 may be decentralized in the sense that all notions of direction in the control signal may be derived from the pairs of relative distance and angle measurements made between a robot and its neighbors. Each robot's decentralized controller may be constrained to be parameterized functions of the relative distances and angles between the robot and its adjacent robots.

2. Human-Swarm Interaction

Figure 2:
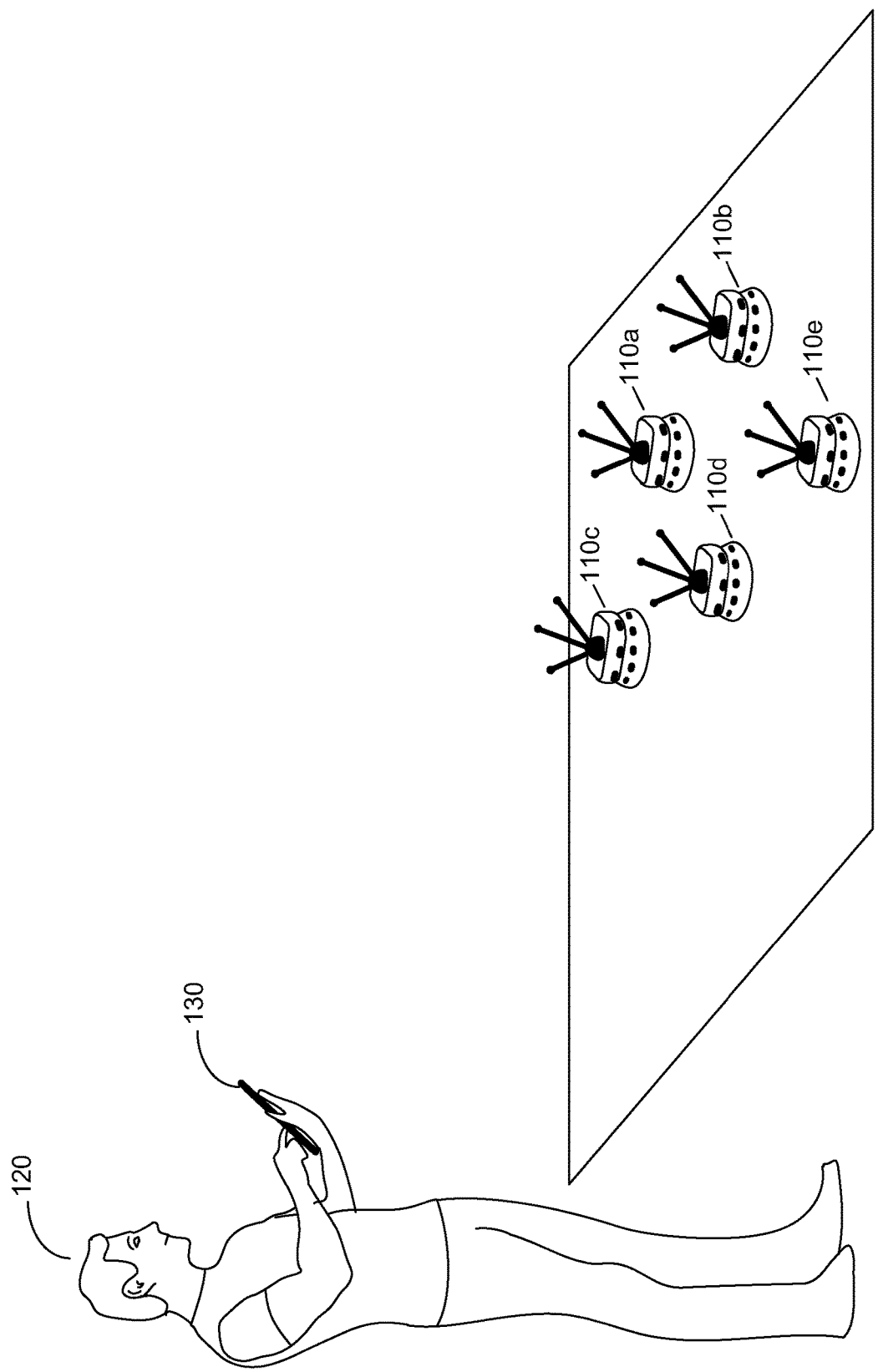
FIG. 2 provides an example illustration of interactions between an operator and a team of robots in accordance with one aspect of the disclosed technology.

FIG. 2 illustrates an example of interactions between an operator 120 and a swarm of robots 110. The operator 120 may interact with the robots at the team level, for instance, by giving the robots a high-level direction. The robots may negotiate among themselves and with the human operator. The robots may figure out how to accomplish the task. Each robot may be autonomous in the sense that each makes its own decision.

Figure 3:
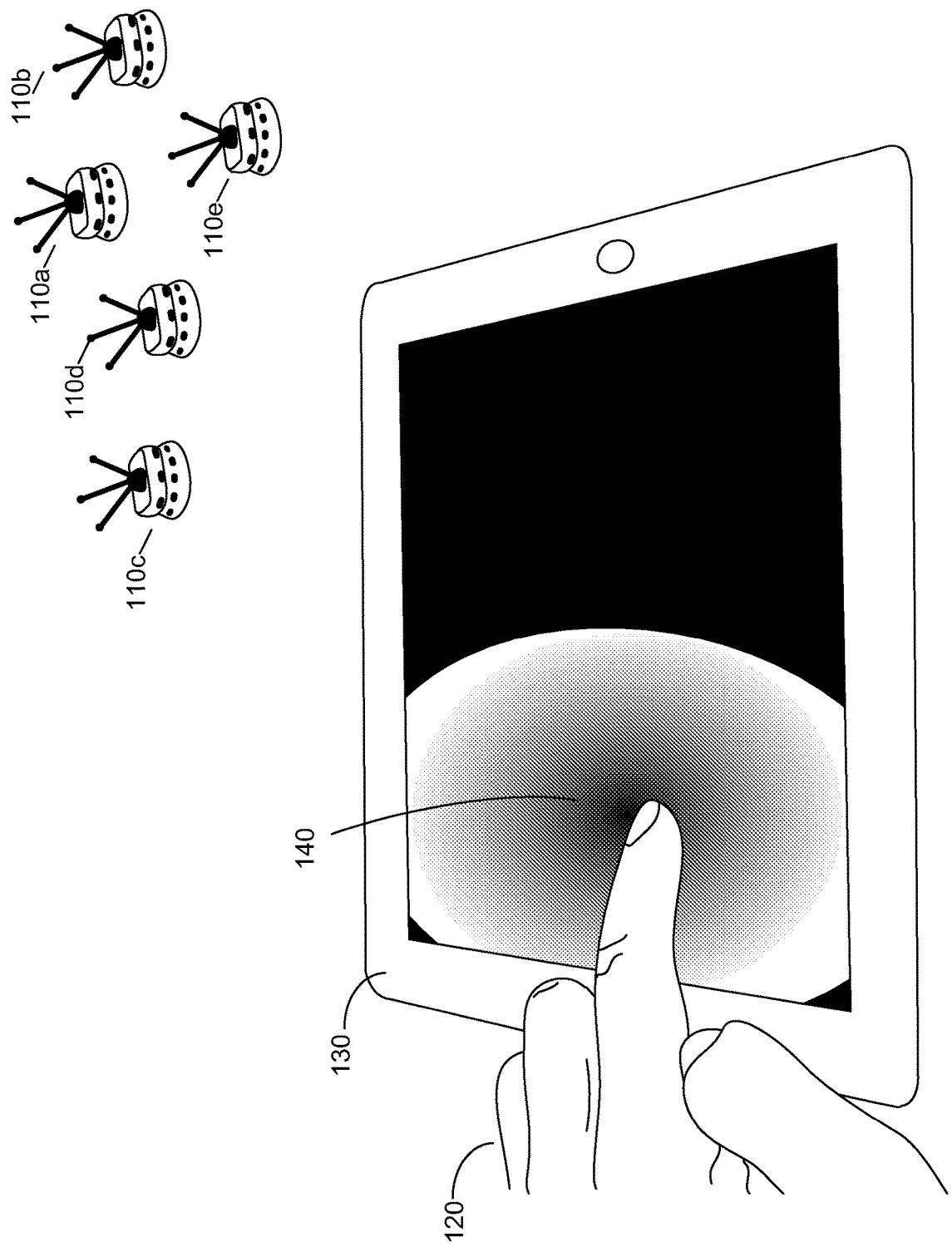
FIG. 3 provides a perspective view of a tablet with light shown in its touch panel in response to human touch in accordance with one aspect of the disclosed technology.

In one example, the operator 120 may instruct the team of robots to cover an area of importance in a domain of interest. The domain of interest may include many areas of importance. The operator 120 may control the team of robots via a smart phone, a tablet, a joystick or any computing device. In the example of FIG. 2, the operator 120 may place or swipe one or more fingers on a tablet 130. The touch screen of the tablet 130 may correspond to the domain of interest. As the operator 120 places or moves a finger on the touch screen, the touched area on the touch screen may light up as illustrated in FIG. 3. The light 140 may diminish in a gradient fashion from the touched area, such that the touched area may have a higher brightness than untouched areas. The finger's position on the touch screen may dictate the area of importance for the team of robots to move to. The brighter the light is, the more important the area is. As such, the finger's position may provide a rough reference for where the team of robots should be located.

Figure 4:
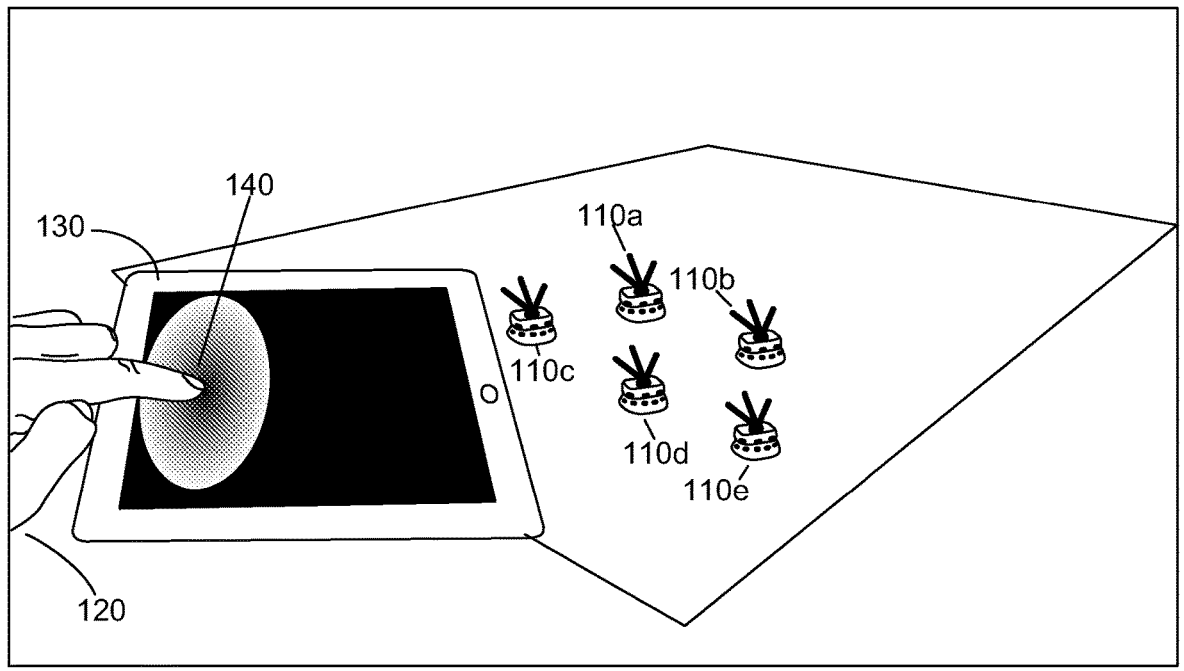
FIGS. 4-5 illustrate examples of commanding the team of robots by manipulating light on the touch panel of the tablet in accordance with one aspect of the disclosed technology.
Figure 5:
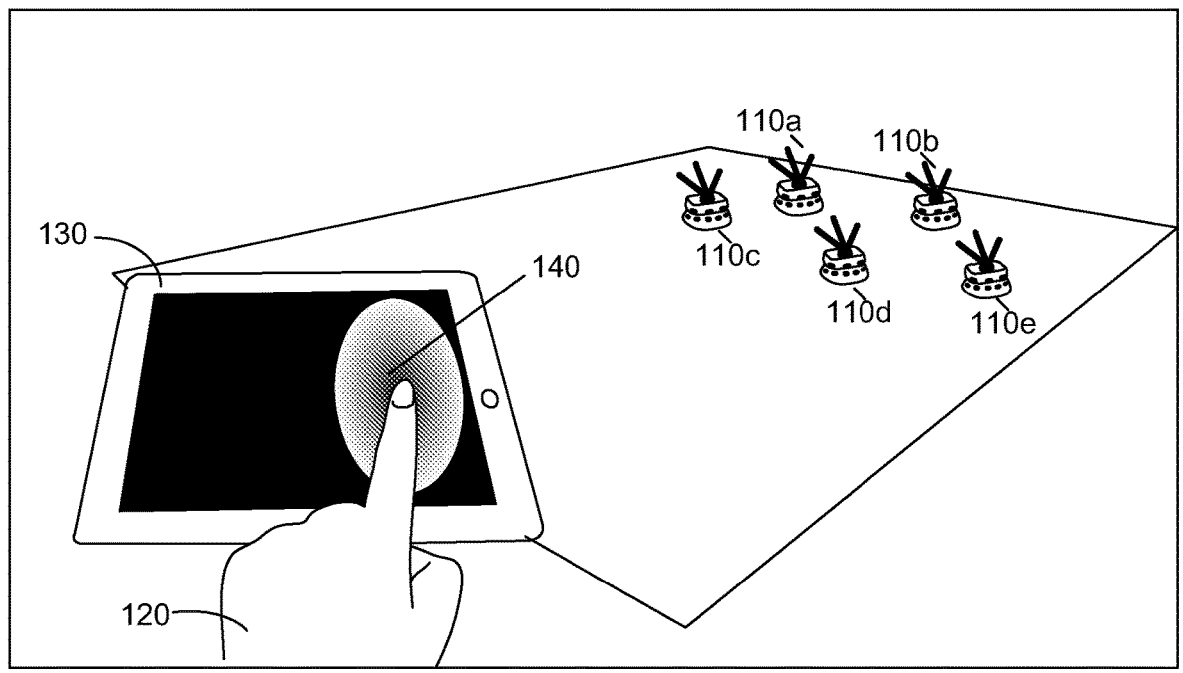

By moving the finger, the operator 120 may change the light density of different areas on the touch screen. As illustrated in FIGS. 3-5, by manipulating the light density, the operator 120 may manipulate the general moving direction of the team of robots as a whole. The tablet 130 may provide the external, human-generated density function to the network of robots as an input. Density functions may represent rough references for where the robots should be located.

Figure 6:
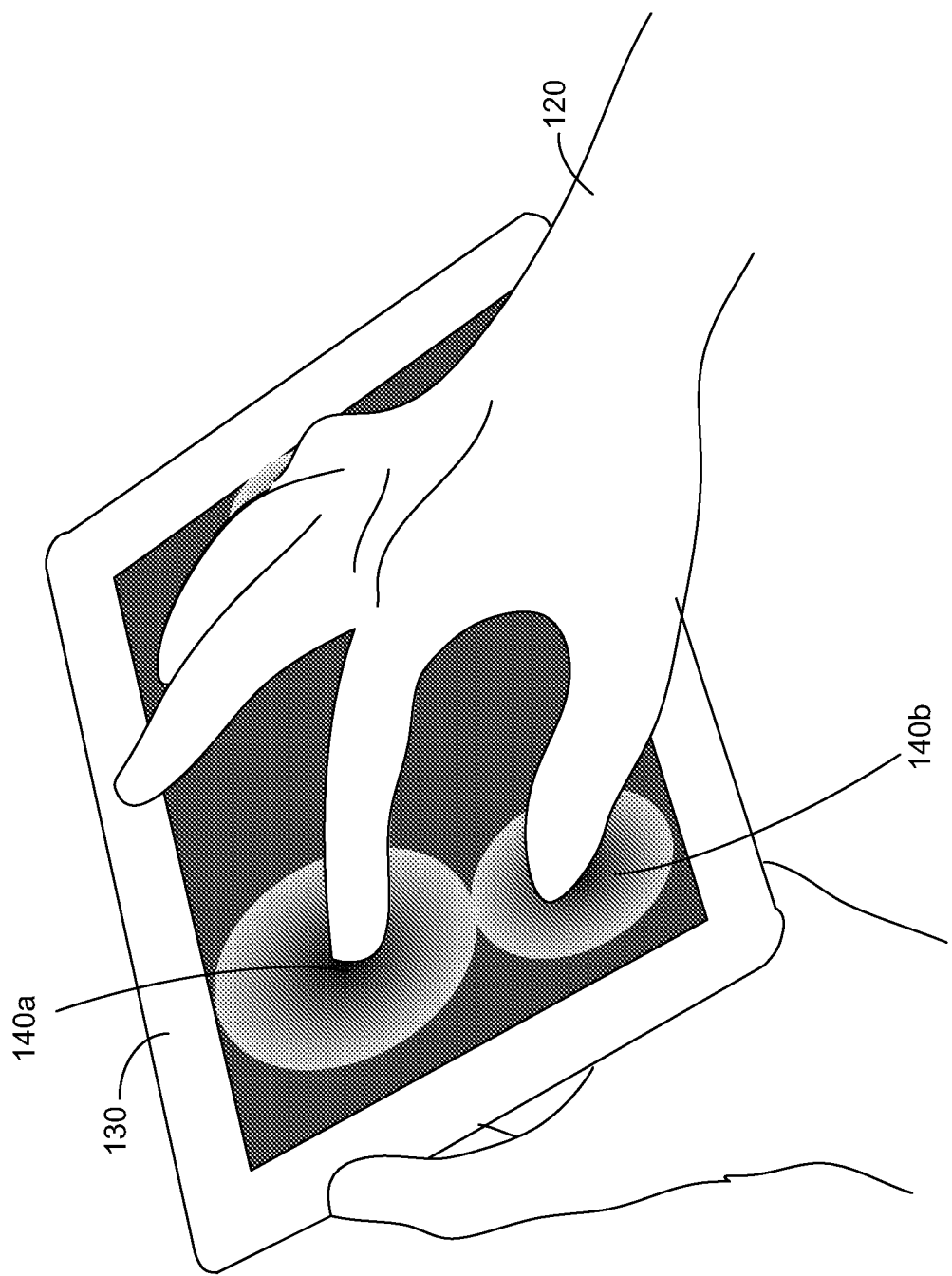
FIG. 6 illustrates a perspective view of the tablet with multiple lights shown in its touch panel in response to multiple finger touches in accordance with one aspect of the disclosed technology.

The tablet 130 may send the light density to each robot. Each robot may move into the area of importance as indicated by the light density. For example, whenever a touch occurs on the tablet 130 screen, the processor in the tablet 130 may identify the position of the touch, and its corresponding area in the domain of interest. The corresponding area in the domain of interest may be regarded as the area of importance. The tablet 130 may send the densities values of the touched area to each robot. As shown in FIG. 6, multiple touches 140a and 140b may occur at the same time. The tablet 130 may send corresponding density values of each touched area to the robots. As the light density changes, the robots may move accordingly towards the area of importance as represented by the light. The density function may be independent of the team size of the robots.

In one example, the operator 120 may externally influence the team of robots via a time-varying density function. The continuous-time algorithm may move the robots so as to provide optimal coverage given the density functions as they evolve over time. In this example, each robot in the team of robots may be implemented with a coverage algorithm based on time-varying density functions.

Each robot may store in its local memory a boundary of the domain of interest. In one example, each robot may not have any map beyond where the domain is located.

Mathematically speaking, $D \subset \mathbb{R}^2$ may be the two-dimensional convex domain representing the domain of interest. $\phi: D \times [0, \infty) \to (0, \infty)$ may be the associated density function, which may be bounded and continuously differentiable in both arguments, where $\phi(q,t)$ may capture the relative importance of a point $q \in D$ at time t. Below are two examples of Density function $\phi$:

$$\phi_1(q, t) = e^{-\left((q_x - 2\sin(\frac{t}{\tau}))^2 + (\frac{q_y}{4})^2\right)} \quad (1)$$

$$\phi_2(q, t) = \sum_{\ell=1}^{M} e^{-\left((q_x - \mu_{x,\ell}(t))^2 + (q_y - \mu_{y,\ell}(t))^2\right)} \quad (2)$$

For example the time constant may be $\tau=5$. For example $(\mu_{x,\ell}(t), \mu_{y,\ell}(t))$ may represent the position on D of the $\ell^{th}$ touch out of M touches on the tablet at time t.

Each robot may be differential-drive robot, and may be modeled as unicycles, $$\dot{x}_i = v_i \cos \theta_i \quad (3)$$

$$\dot{y}_i = v_i \sin \theta_i \quad (4)$$

$$\dot{\theta}_i = \omega_i \quad (5)$$

where $(x_i, y_i)$ may represent the position of robot i, $\theta_i$ may represent the heading of the robot i, and $v_i$, $\omega_i$ may represent the translational and angular velocities of the robot i. The position of the ith robot may be represented as $p_i \in D$, $i=1, \ldots, n$. The desired motions for each robot i may also be represented in terms of $\dot{p}_i$ for purposes of the coverage algorithm, where $\dot{p}_i$ may be mapped onto $v_i$, $\omega_i$ through the following equations:

$$v_i = \|\dot{p}_i\| \quad (6)$$

$$\omega_i = [-\sin\theta_i \quad \cos\theta_i] \cdot \frac{\dot{p}_i}{\|\dot{p}_i\|}. \quad (7)$$

An optimal partition of the domain of interest may be represented as follows to ensure optimal coverage of the domain by the robots with minimal locational cost:

$$V_i(p) = \{q \in D | \|q - p_i\| \le \|q - p_j\|, i \ne j\} \quad (8)$$

This partition of D may be regarded as a Voronoi tessellation. $V_i$ may denote the region. The Voronoi partitions may be computed based on the position and orientation data provided by motion capture cameras on the robots.

Figure 7:
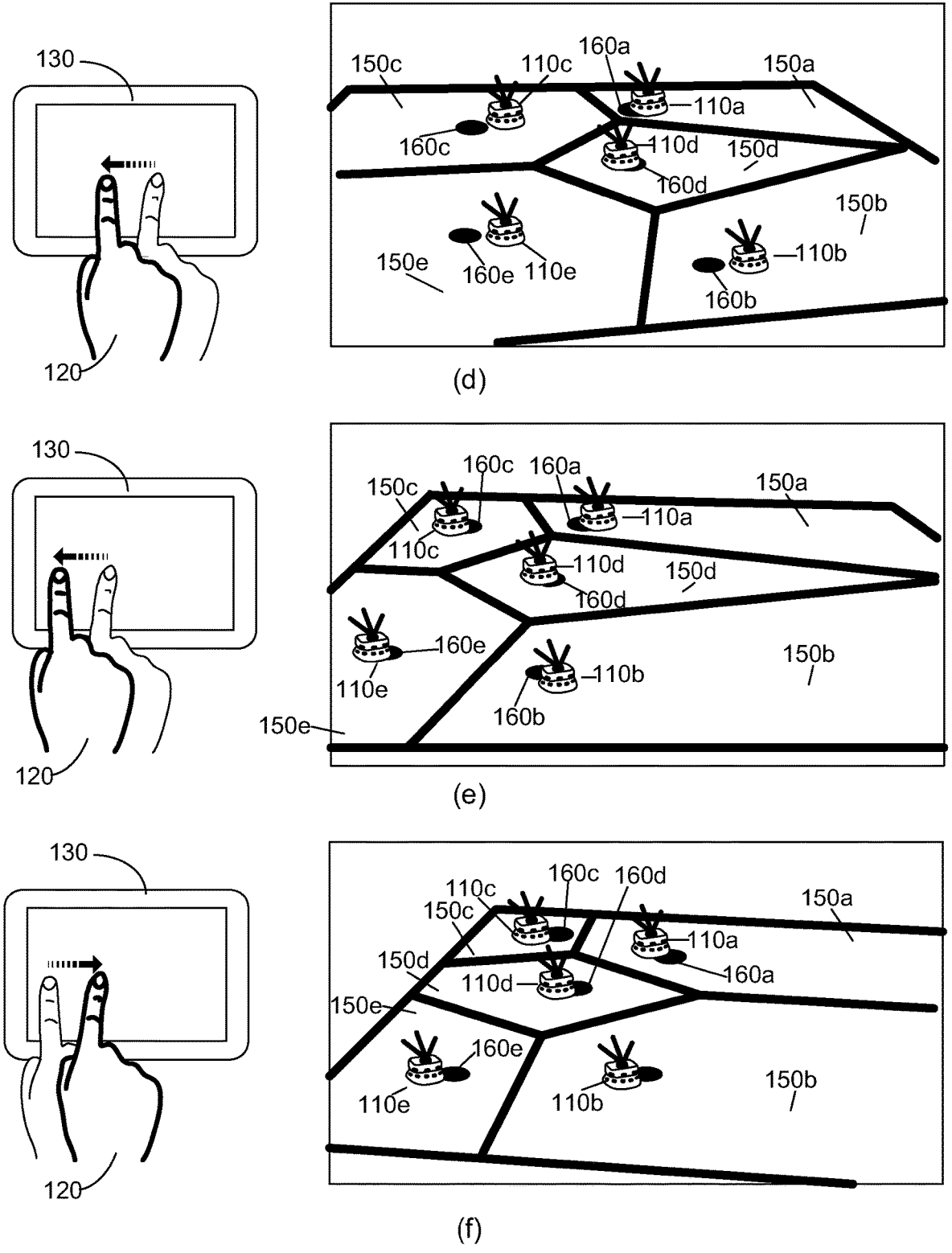
FIG. 7(a)-(f) illustrates movement of the team of robots in a domain of interest partitioned by the Voronoi cells in accordance with one aspect of the disclosed technology.

Since $\phi \ge 0$, the mass $m_i$ and center of mass $c_i$ of the i-th Voronoi cell, $V_i$, may be defined as $$m_i(p, t) = \int_{V_i(p)} \phi(q, t) \, dq \quad (9)$$

$$c_i(p, t) = \frac{\int_{V_i(p)} q\phi(q, t) \, dq}{m_i} \quad (10)$$

p may be a so-called Central Voronoi Tesselation (CVT). The CVT may refer to a configuration where the positions of each robot coincide with the centroids of their Voronoi cells, given a so-called Voronoi tessellation of the domain of interest. When at a CVT, the robots may reach a configuration, mathematically represented as $\{\|p_i - c_i\|^2 = 0, i=1, \ldots, n\}$, i.e., to a CVT. The Voronoi cell partition may be independent of the density. FIG. 7(a)-(f) illustrates a team of five mobile robots implemented with distributed coverage algorithm. In FIG. 7(a)-(f), the thick lines represent delineation of the Voronoi cells 150a-e, whose centers of mass 160a-e are shown as dark circles. Each Voronoi cell may represent a portion of space closest to a robot. For example, each of the Voronoi cells 150a-e may respectively represent a portion of space closest to one of the robots 110a-e. As shown in FIG. 7(a-(f), the Voronoi cells partition may constantly change as robots 110a-e move. The robots 110a-e may calculate their Voronoi cells based on the positions of their neighbors. Based on the density information it receives, each robot may predict how its Voronoi cell will change, and how its neighbors' cells will change, as it moves to better cover the density, and compensates for this change in its motion.

To achieve optimal coverage, the robots may initially converge to the CVT associated with a static density function. For example, at an initialization step, the CVT may be achieved at initial time $t_0$, i.e., $p(t_0) = c(p(t_0), t_0)$, where $c = [c_1^T, \ldots, c_n^T]^T$. A static density function $\phi$ may be chosen initially. Until the robots achieve a CVT, and a time-invariant algorithm, such as Lloyd's algorithm as shown below, may be deployed. This may happen asymptotically.

$$\dot{p}_i = -k(p_i - c_i) \quad (11)$$

$\dot{p}_i$ may represent a gradient descent motion for each individual robot to execute, where k may be a positive gain. $(p_i - c_i)$ may represent the gradient direction (with respect to $p_i$).

2.1 Time-Varying Density Function

After the robots reach the CVT, the initialization process may end. Following the initialization, the robots may maintain the CVT by executing a time-varying density function implemented on each robot. Timing information must be included in the motion of the robots. The robots may not need to share a sense of direction in a global frame. Each robot may determine its own motion based on information of adjacent robots.

For instance, each robot may determine its velocity vector based on relative displacement vectors with respect to its neighbors. The velocity vector may be computed by a time-varying density function. Mathematically speaking, the update rule for $\dot{p}_i$ may only depend on $p_j$, $j \in Nv_i$, as well as $p_i$ itself. $Nv_i$ may represent the set of Voronoi cells adjacent to Voronoi cell i. Two Voronoi cells may be adjacent if they share a face.

Each robot may determine its velocity vector to best cover the density. Each robot may determine its velocity vector in a manner to compensate for the density changing over time, and to compensate for its neighbors' movement.

The time-varying density function may be derived using well-posed Neumann approximation of the inverse as a mechanism for achieving the distributed version of a time-varying centralized function.

2.1.1 TVD-$D_1$

Below is an example time-varying-density, decentralized with 1-hop adjacency information (TVD-$D_1$). The gradient descent motion $\dot{p}_i$ for each individual robot to execute may be calculated as follow:

$$\dot{p}_i = \frac{\partial c_i}{\partial t} - k(p_i - c_i) + \sum_{j \in N_{V_j}} \frac{\partial c_i}{\partial p_j}\left(\frac{\partial c_j}{\partial t} - k(p_j - c_j)\right). \quad (12)$$

where ($p_i$–$c_i$) may represent the gradient direction (with respect to $p_i$).

2.1.2 Computation of Term $$\frac{\partial c}{\partial p}.$$

Leibniz rule must be exercised to compute the term $$\frac{\partial c}{\partial p}.$$

In the following, $p_j^{(b)}$ may denote the b-th component of the vector $p_j$. When $D \in \mathbb{R}^2$, b=1,2 represents a planar case. Based on Leibniz rule, the following equations may be obtained:

$$\frac{\partial c_i^{(a)}}{\partial p_j^{(b)}} = \left(\int_{\partial V_{i,j}} \phi q^{(a)} \frac{p_j^{(b)} - q^{(b)}}{\|p_j - p_i\|} dq\right)/m_i - \left(\int_{\partial V_{i,j}} \phi \frac{p_j^{(b)} - q^{(b)}}{\|p_j - p_i\|} dq\right)\left(\int_{V_i(P)} \phi q^{(a)} dq\right)/m_i^2 \quad (13)$$

where $\alpha$=1,2 and where i≠j.

Similarly, when i=j, the following equation may be obtained:

$$\frac{\partial c_i^{(a)}}{\partial p_i^{(b)}} = -\sum_{k \in N_{V_i}}\left[\left(\int_{\partial V_{i,k}} \phi q^{(a)} \frac{q^{(b)} - p_i^{(b)}}{\|p_k - p_i\|} dq\right)/m_i - \left(\int_{\partial V_{i,k}} \phi \frac{q^{(b)} - p_i^{(b)}}{\|p_k - p_i\|} dq\right)\left(\int_{V_i(P)} \phi q^{(a)} dq\right)/m_i^2\right] \quad (14)$$

2.1.3 Locational Cost

Figure 8:
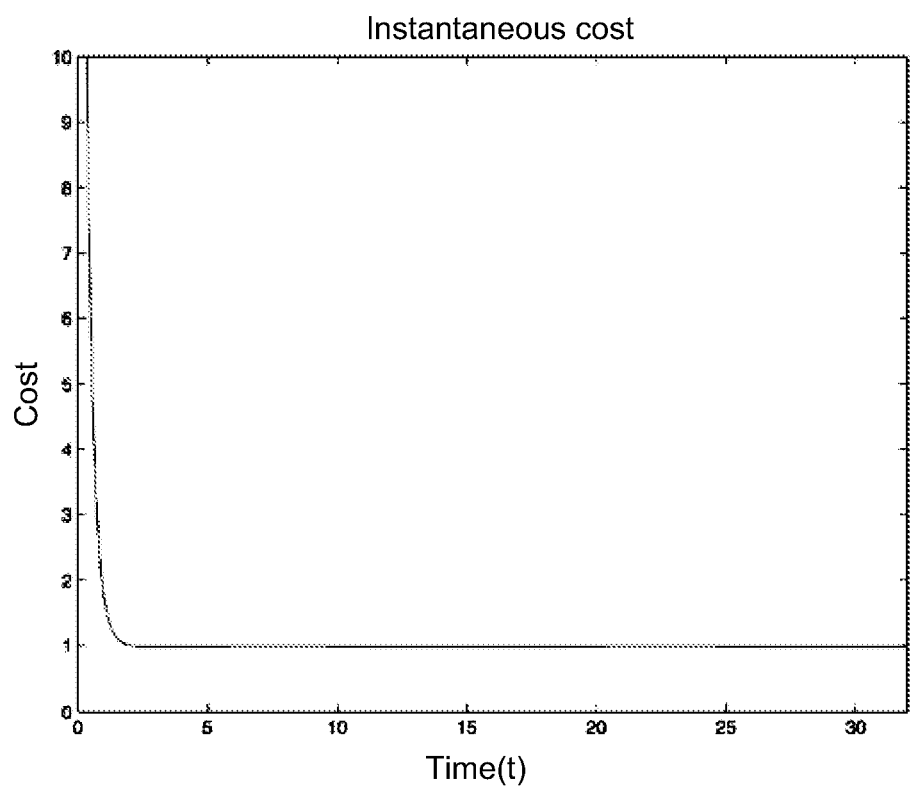
FIG. 8 illustrates an instantaneous locational cost when executing TVD-$D_1$ under a density function in accordance with one aspect of the disclosed technology.

FIG. 8 illustrates an instantaneous locational cost when executing TVD-$D_1$ under density function $\phi_2$. The locational cost may represent the minimum distance that each robot has to drive. The locational cost may describe how well a given area is being covered. The locational cost may evaluate how effective given robot configurations are at achieving coverage. The locational cost may be computed as follows:

$$H(p, P, t) = \sum_{i=1}^{n} \int_{P_i} \|q - p_i\|^2 \phi(q, t) dq \quad (15)$$

Figure 9:
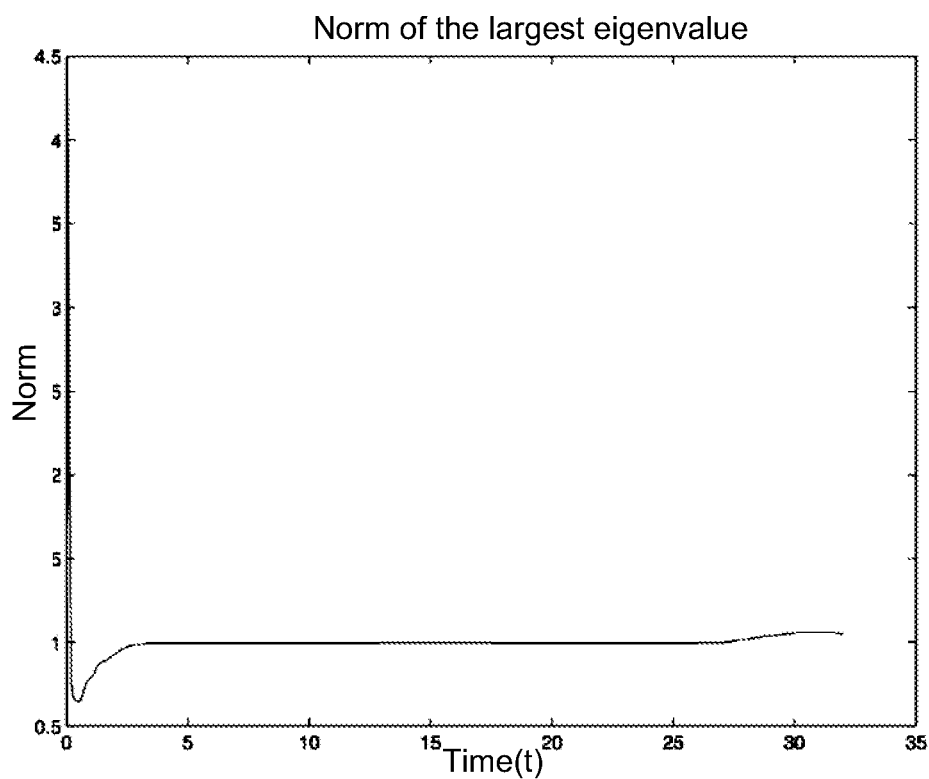
FIG. 9 illustrates the magnitude of $\lambda_{max}$ of as a function of time when executing TVD-$D_1$ under a density function in accordance with one aspect of the disclosed technology.

As shown in FIG. 8, even when the magnitude of the maximal eigenvalue hovers close to 1 for longer periods of time, the Neumann approximation TVD-$D_1$ remains valid, and does not affect the performance of the algorithm. FIG. 9 illustrates the magnitude $A_{max}$ of as a function of time when executing TVD-$D_1$ under density function $\phi_2$, where $\lambda_{max}$ may denote the eigenvalue with the largest magnitude of the matrix $$\frac{\partial c}{\partial p}.$$

2.1.4. TVD-$D_k$

When higher order terms are kept in the Neumann series, dist(i, j) may denote the distance between cells i and j. In one example, dist(i, j) may represent an edge distance between i and j in the Delaunay graph induced by the Voronoi tesselation.

$$\frac{\partial c}{\partial p}$$

may represent a (block) adjacency matrix, the following may be obtained:

$$\left[\left(\frac{\partial c}{\partial p}\right)^k\right]_{ij} \neq 0 \Rightarrow dist(i, j) \leq k, k = 0, 1, 2, \ldots \quad (16)$$

where $[\cdot]_{ij}$ may denote the block corresponding to cell $c_i$ and robot position $p_j$.

The k-hop version of TVD-$D_1$ may be represented by TVD-$D_k$, $\dot{p}$ may be calculated as follows:

$$\dot{p} = \sum_{\ell=0}^{k} \left(\frac{\partial c}{\partial p}\right)^{\ell}\left(-k(p-c) + \frac{\partial c}{\partial t}\right), \quad (17)$$

2.2 Example Flow Diagram

Figure 10:
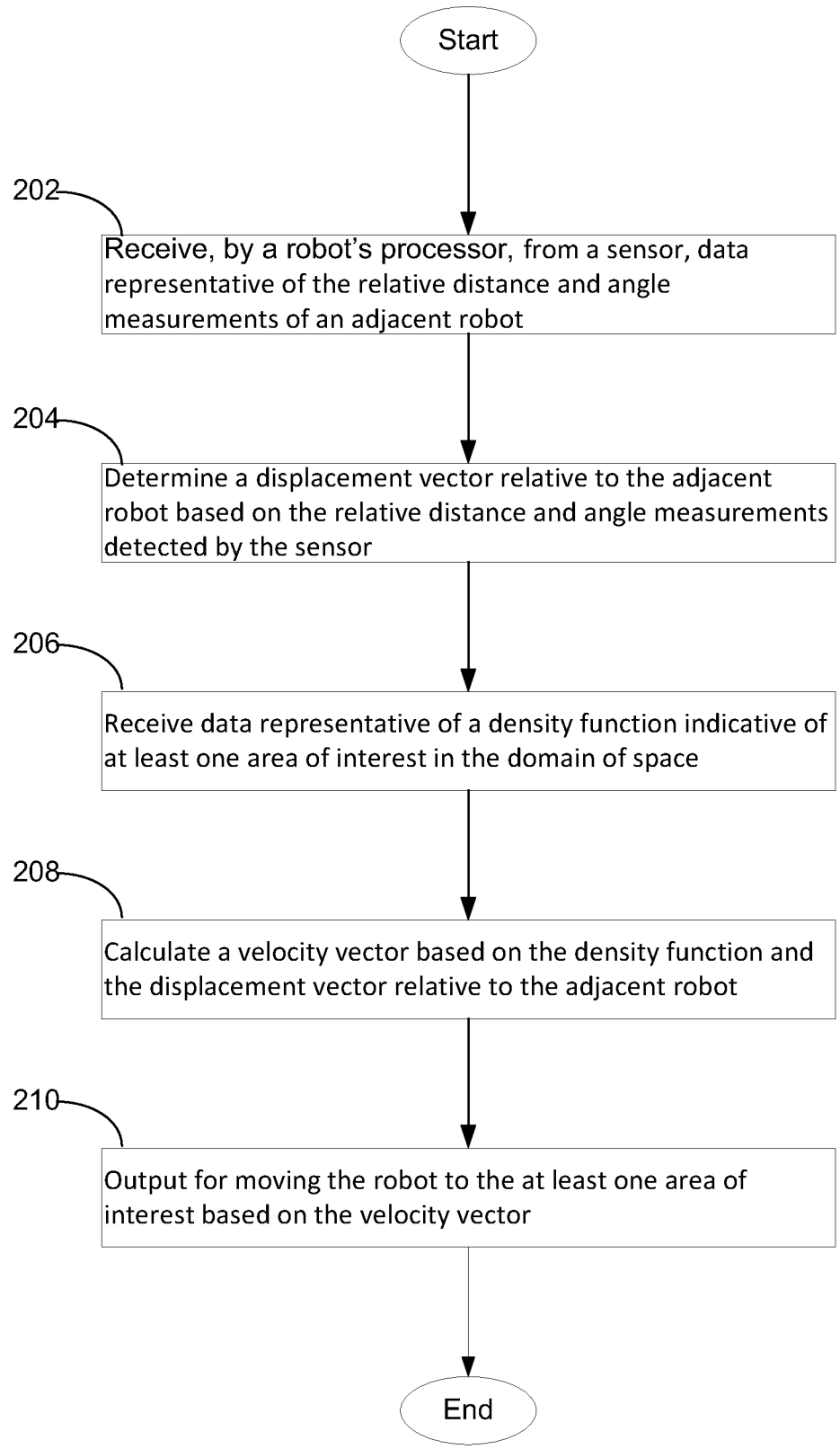
FIG. 10 is a flow diagram of a method, according to one aspect of the disclosed technology.

According to one aspect of the disclosed technology, a plurality of mobile robots may together cover a domain of interest. Each robot may include a processor. FIG. 10 is a flow-diagram of an example method, in accordance with an exemplary embodiment of the disclosed technology. In block 202, the processor may receive, from a sensor, data representative of the relative distance and angle measurements of an adjacent robot. In block 204, the processor may determine a displacement vector relative to the adjacent robot based on the relative distance and angle measurements detected by the sensor. In block 206, the processor may receive data representative of a density function indicative of at least one area of importance in the domain of interest. In block 208, the processor may calculate a velocity vector based on the density function and the displacement vector relative to the adjacent robot. In block 210, the processor may output for moving the robot to the at least one area of importance in the domain of interest based on the velocity vector.

In one implementation, the processor of each robot may calculate the velocity vector based on displacement vectors relative to all adjacent robots.

In one implementation, the processor may compute the velocity vector based on a time-varying density function.

In one implementation, the domain of interest may be divided based on the Voronoi cell partition. Each robot may occupy a Voronoi cell. The processor may compute a change in the robot's Voronoi cell, and a change in the adjacent robot's Voronoi cell. The processor may calculate the velocity vector to compensate for the changes.

In one implementation, the processor may receive the data representative of the density function from a computing device. The computing device may have a touchable screen. The computing device may output the density function in response to a touch on the screen, and may determine the density function based on a position and amount of the touch on the screen.

3. Scripted Formation

According to another aspect of the present technology, a team of robots may be assigned to perform a sequence of motions or a sequence of formations, where the sequence of motions may be expressed in terms of trajectories of individual robots. Although the team as a whole is assigned to the task or mission, each robot may not have a pre-assigned role. Rather, once the team of the robots as whole is assigned to the task, individual robots may coordinate their own activities to perform or build the sequence.

The team of robots may start in a random configuration. Once the team of robots is instructed to perform a sequence of motions or formations, the team of robots may perform the formation at any position and with any rotation. Each robot may know only the relative positions of the other robots. Each robot may independently identify the proper formation position as well as its role in the formation.

Any formation may be disturbed when a new robot is added to the team, an exhibiting robot is removed from the team, or when an exhibiting robot is removed from its pose by an external factor such as an operator. When such a disturbance occurs, the team of robots may react by altering the assignment and formation pose.

The information flow between robots may be given by a predetermined static graph topology. The information flow among the team of robots may be limited by a predefined network topology. Each robot may distinguish the identity of its neighbors from one another. The robots may have synchronized clocks allowing them to perform open-loop clock-based transitions between different controllers.

For a given desired trajectory, the team of robots may optimally mimic the trajectory using a decentralized control law in the form of a switched autonomous system. In the switched autonomous system, each robot may have a plurality of modes that are parameterized by scaling and rotation factors associated with each neighbor. For instance, each robot may receive a formation "shape." Based on relative displacement information, each robot may determine how to realize the shape. For example, each robot may determine where it should be located and rotated, and how it should be scaled.

To perform a sequence of formations, each robot may switch between consecutive modes. Each robot may constantly reassess the best formation pose and role assignment. Each mode may be defined by a plurality of parameters. The parameters may include orientation, translation, and scaling of the formation. A robot may choose parameters that minimize the distance it has to drive. The optimal parameters may be the parameters that make the decentralized trajectories track the desired trajectories the best. To mimic the desired trajectory, the mode parameters and switch times may be optimized in a decentralized setting. To do this, certain pertinent results, such as optimality conditions and costate equations, may be derived for optimizing parameterized modes in a general setting, and then may be extended towards a decentralized setting. Similar results may be derived for switching times.

For implementation, given a desired trajectory, the parameters and switch times may be optimized using a steepest decent algorithm on the above mentioned derived results. Each robot may then execute its motion dictated by these optimized parameters and switch times.

The optimality conditions for the parameters may be derived as described herein.

3.1 System Dynamics

In one embodiment, the team of robots may accomplish a mission, e.g., a desired sequence of motions or formations. Each robot's trajectory may start at time $t=0$, and end at time $t=T$. Each robot may switch modes for a total of K global switch times $\tau_1, \ldots, \tau_K$, where $$0 = \tau_0 \leq \tau_1 \leq \ldots \leq \tau_K \leq \tau_{K+1} = T, \quad (18)$$

with the kth mode occurring at the time interval $[\tau_{k-1}, \tau_k)$.

Under global clock-based switching, each robot may have K+1 modes and each of its modes may be parameterized by scaling and rotation factors associated with each neighbor. The dynamics for the ith robot operating in the kth mode may be represented as follows:

$$\dot{x}_i = -\sum_{j \in N_i} r_{ijk} Rot(\theta_{ijk})(x_i - x_j) \quad (19)$$

with $r_{ijk} \in \mathbb{R}$ and $v_{ijk} \in [0, 2\pi]$ being the constants used for scaling and rotating the displacement vector respectively between itself and robot j. The matrix $$Rot(\phi) = \begin{bmatrix} \cos(\phi) & -\sin(\phi) \\ \sin(\phi) & \cos(\phi) \end{bmatrix} \quad (20)$$

may define the two-dimensional rotation matrix for counter-clockwise rotation of a vector.

In the alternative, the dynamics in Equation (19) may be rewritten as follows:

$$\dot{x}_i = -\sum_{j \in N_i} M_{ijk}(x_i - x_j) \quad (21)$$

where $$M_{ijk} = \begin{bmatrix} a_{ijk} & -b_{ijk} \\ b_{ijk} & a_{ijk} \end{bmatrix},$$

$$a_{ijk} = r_{ijk}\cos(\theta_{ijk}),$$

and $$b_{ijk} = r_{ijk}\sin(\theta_{ijk}).$$

The entire system dynamics may be collected together in matrix form. Let $x \in \mathbb{R}^{2N}$ be $$x = \begin{bmatrix} x_1 \\ \vdots \\ x_N \end{bmatrix} \quad (22)$$

i.e., x contains the positions of the N robots. The (2N×2N) adjacency matrix $A_k$ associated with the kth mode may be defined in terms of (2×2) blocks by $$A_{ijk} = \begin{cases} M_{ijk} & \text{if } (v_j, v_i) \in E \\ 0 & \text{otherwise} \end{cases}. \quad (23)$$

The (2N×2N) degree matrix $D_k$ associated with the kth mode may be also defined in terms of (2×2) blocks, and may be given by $$D_{ijk} = \begin{cases} \sum_{z|(v_z, v_i) \in E} M_{izk} & \text{if } i = j \\ 0 & \text{otherwise} \end{cases} \quad (24)$$

The weighted Laplacian $L_k$ associated with the kth mode may be defined as $$L_k = D_k - A_k \quad (25)$$

The evolution of the switched autonomous system of N robots with K+1 modes may be described by the dynamics $$\dot{x} = -L_k x \; \forall t \in [\tau_{k-1}, \tau_K), \quad (26)$$

with mode indices k=1, . . . , K+1.

3.2 Optimal Decentralization

For a system of N robots with positions x(t) and initial positions $x(0)=x_0$, a decentralized version of a desired trajectory may be represented by $x_d(t)$. Given a desired trajectory for the multi-robot system, an aspect of the present technology may imitate that behavior using only decentralized control laws, while minimizing the cost functional $$J = \tfrac{1}{2}\int_0^T \|x(t) - x_d(t)\|^2 \, dt \quad (27)$$

for the team of robots with dynamics (26) by optimizing the parameters $a_{ijk}$ and $b_{ijk}$ for each of the K+1 modes, and the K global switch times $\tau_k$, while satisfying (1).

The costate dynamics and optimality conditions for optimizing parameterized modes may be derived in a general setting. The results may be specialized to the decentralized system (26). The resulting optimality conditions and costate equations may be used in conjunction with a steepest descent algorithm. Together they may optimize the modes and global switching times of the decentralized system to minimize J, and thus optimally decentralize $x_d(t)$.

3.2.1 Parameterized Mode Optimization

A switched autonomous system of robots may start at time t=0, and end at time t=T, with K+1 modes and K switching times. Each of the modes' dynamics may be given by the function f, but may be parameterized by different scalar parameters $c_k$ for each mode k. The switching times may be $\tau_1, \ldots, \tau_K$ satisfying (18), with the k th mode occurring in the time interval $[\tau_{k-1}, \tau_K)$. The dynamics of the system may be expressed as:

$$\dot{x} = F(x, C, t) \quad (28)$$

with $$F(x, C, t) = f(x, c_k) \, \forall t \in [\tau_{k-1}, \tau_k), \quad (29)$$

where $c_k$ may be free to be chosen and $C = [c_1, c_{k+1}]^T$. The objective is to choose C so as to minimize the generalized cost functional $$J = \int_0^T H(x(t)) \, dt \quad (30)$$

The optimality condition for each $c_k$ in (29) with respect to cost (30) may be represented as $$\nabla J_{c_k} = \int_{\tau_{k-1}}^{\tau_k} \frac{\partial f}{\partial c_k}(\tau, c_k)^T p(\tau) \, d\tau = 0 \quad (31)$$

where p may represent the costate with dynamics $$\dot{p} = -\left(\frac{\partial F}{\partial x}\right)^T p - \left(\frac{\partial H}{\partial x}\right)^T \quad (32)$$

and boundary condition $$p(T) = 0 \quad (33)$$

To apply these results to the problem of optimal decentralization, the optimality conditions and costate dynamics may be specialized for the decentralized system (26) and cost (27). To minimize J, the parameters $a_{ijk}$ and $b_{ijk}$ associated with each of the K+1 modes may be optimized. Define $a_k = [\ldots a_{ijk} \ldots]^T$ and $b_k = [\ldots b_{ijk} \ldots]^T$ over all valid combinations of i and j allowed by the graph topology. They may represent vectors containing all the parameters appearing in the system dynamics for a particular mode k.

Optimality conditions for $a_k$ and $b_k$ with respect to cost (27) may be computed as follows $$\nabla J_{ak} = \int_{\tau_{k-1}}^{\tau_k} \frac{\partial f}{\partial a_k}(\tau, a_k)^T p(\tau) d\tau = 0. \quad (34)$$

$$\nabla J_{bk} = \int_{\tau_{k-1}}^{\tau_k} \frac{\partial f}{\partial b_k}(\tau, b_k)^T p(\tau) d\tau = 0. \quad (35)$$

The $$\frac{\partial f}{\partial a_k}$$

and $$\frac{\partial f}{\partial b_k}$$

matrices may be populated using (2×1) blocks based on the following $$\frac{\partial f_i}{\partial a_{ijk}} = -(x_i - x_j) \quad (36)$$

$$\frac{\partial f_i}{\partial b_{ijk}} = -\begin{bmatrix} 0 & -1 \\ 1 & 0 \end{bmatrix}(x_i - x_j), \quad (37)$$

where $f_i$ may be the (2×1) block of f corresponding to the dynamics of agent i.

The decentralized system dynamics (26) and cost functional (27) may also need to be substituted into the costate dynamics (32).

Costate dynamics for calculating the optimality conditions of $a_k$ and $b_k$ in (34) and (35) may be represented as:

$$\dot{p}(t) = L^T_k p(t) - x(t) + x_d(t) \forall t \in [\tau_{k-1}, \tau_k), \quad (38)$$

3.2.2 Switch Time Optimization

The optimality condition with respect to cost functional (30) for switching times in a switched autonomous system where mode k has dynamics f parameterized by $c_k$ may be represented as:

$$\frac{\partial J}{\partial \tau_k} = p(\tau_k)^T (f(x(\tau_k), c_k) - f(x(\tau_k), c_{k+1})) = 0. \quad (39)$$

The costate dynamics may be the same as (32) and boundary conditions (33). The switch time optimality conditions specialized for the system (26) with cost (27) may be given by $$\frac{\partial J}{\partial \tau_k} = p(\tau_k)^T (L_{k+1} - L_k) x(\tau_k). \quad (40)$$

with costate dynamics the same as (38).

3.3 Example Flow Diagram

Figure 11:
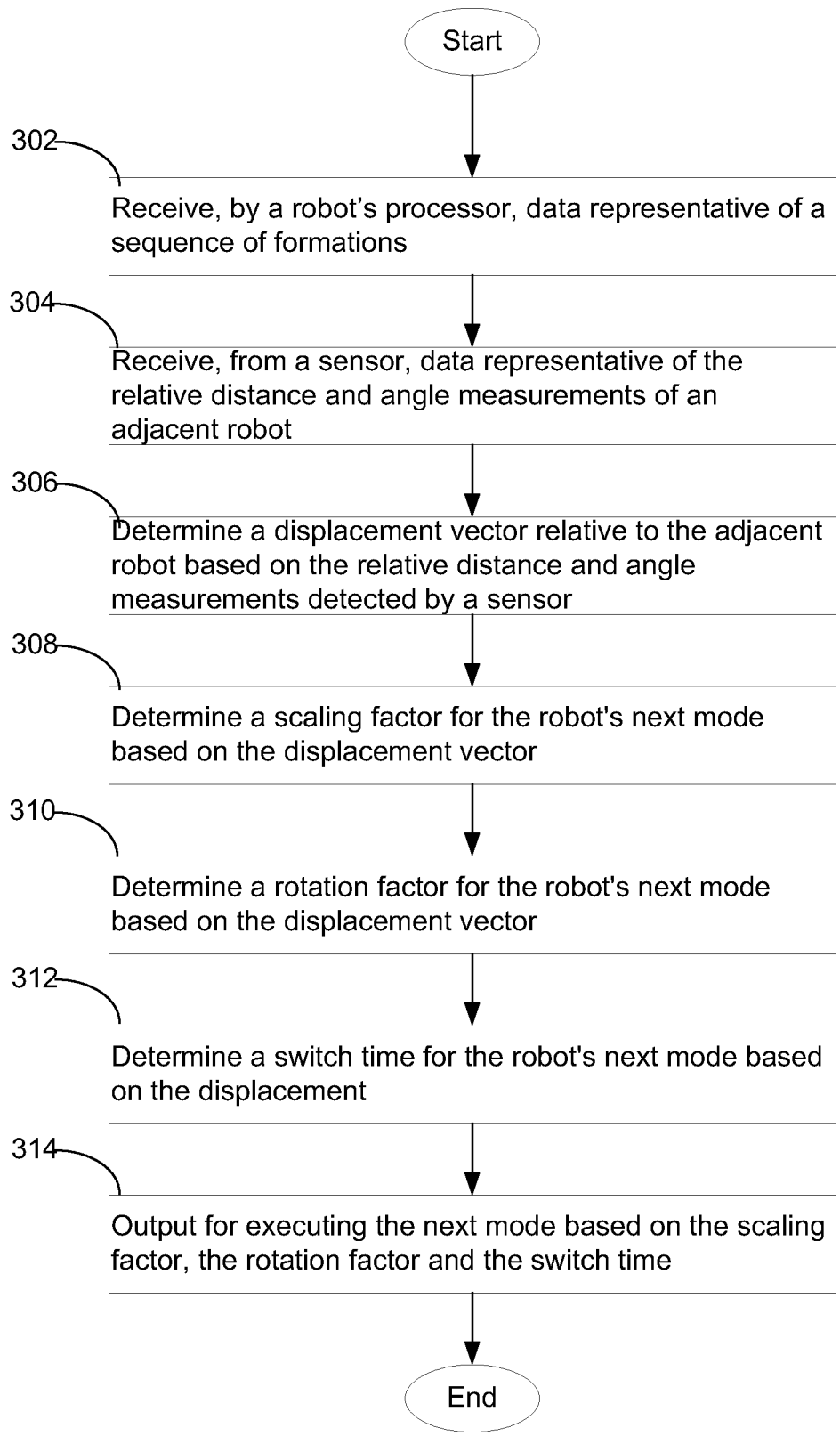
FIG. 11 is a flow diagram of a method according another aspect of the disclosed technology.

According to one aspect of the disclosed technology, a plurality of mobile robots may together perform a sequence of formations. Each robot may mimic a trajectory as part of its performance. Each robot may mimic the trajectory by switching among a plurality of motion modes. Each robot may include a sensor and a processor. FIG. 11 is a flow-diagram of an example method, in accordance with an exemplary embodiment of the disclosed technology. In block 302, the processor may receive data representative of the sequence of formations. In block 304, the processor may receive, from the sensor, data representative of the relative distance and angle measurements of an adjacent robot. In block 306, the processor may determine a displacement vector relative to the adjacent robot based on the relative distance and angle measurements detected by the sensor. In block 308, the processor may determine a scaling factor for the robot's next mode based on the displacement vector. In block 310, the processor may determine a rotation factor for the robot's next mode based on the displacement vector. In block 312, the processor may determine a switch time for the robot's next mode based on the displacement. In block 314, the processor may output for executing the next mode based on the scaling factor, the rotation factor and the switch time.

In one implementation, the processor of each robot may calculate displacement vectors relative to all its adjacent robots. The processor may determine parameters for the robot's next mode, including the scaling factor, rotation factor and switch time, based on the displacement vectors relative to all its adjacent robots.

In one example implementation, the processor may optimize the scaling factor, rotation factor and switch time based on an optimality condition and a costate equation.

In one example implementation, the processor may optimize the scaling factor, rotation factor and switch time by performing a steepest decent algorithm.

In one example implementation, the scaling factor may scale the displacement vector by multiplying a relative distance measurement between two adjacent robots by a constant.

In one example implementation, the rotating factor may rotate the displacement vector by adding a constant to a relative angle measurement.

3.4 Example Simulation

FIG. 12(a-(l)) showcases a simulation of the above optimal decentralization algorithm that involves tracking a complex drumline-inspired multi-robot trajectory. Drum line formations are traditionally designed by choreographers to be executed in a centralized manner. The position and path taken by band members at each moment in time have been predetermined to a high level of detail. As a result, band members spend a lot of time practicing to follow these predetermined paths. However, such an approach requires each band member to memorize paths taken throughout the entire dance sequence and have global sensing capabilities to know if they're in the correct position. Optimal decentralization described herein may mimic the original routine with high fidelity using decentralized control laws.

In the example as illustrated in FIG. 12(a-(l)), the optimal decentralization algorithm may be used on a drum line-inspired trajectory involving N=21 robots with arbitrarily chosen initial values for each of their parameterized modes. A total of K=22 global switching times may be inserted initially evenly spaced between the starting time t=0 and ending time t=T=10.78. The system of the robots may have up to 23 modes.

FIG. 12(a-(l)) illustrates the optimally decentralized trajectories resulting from the optimization, where the actual locations of the agents are marked by O's with lines connecting them to their desired location marked by X's. As seen in the simulation results, the resulting decentralized control laws may successfully mimic the original trajectory.

Figure 13:
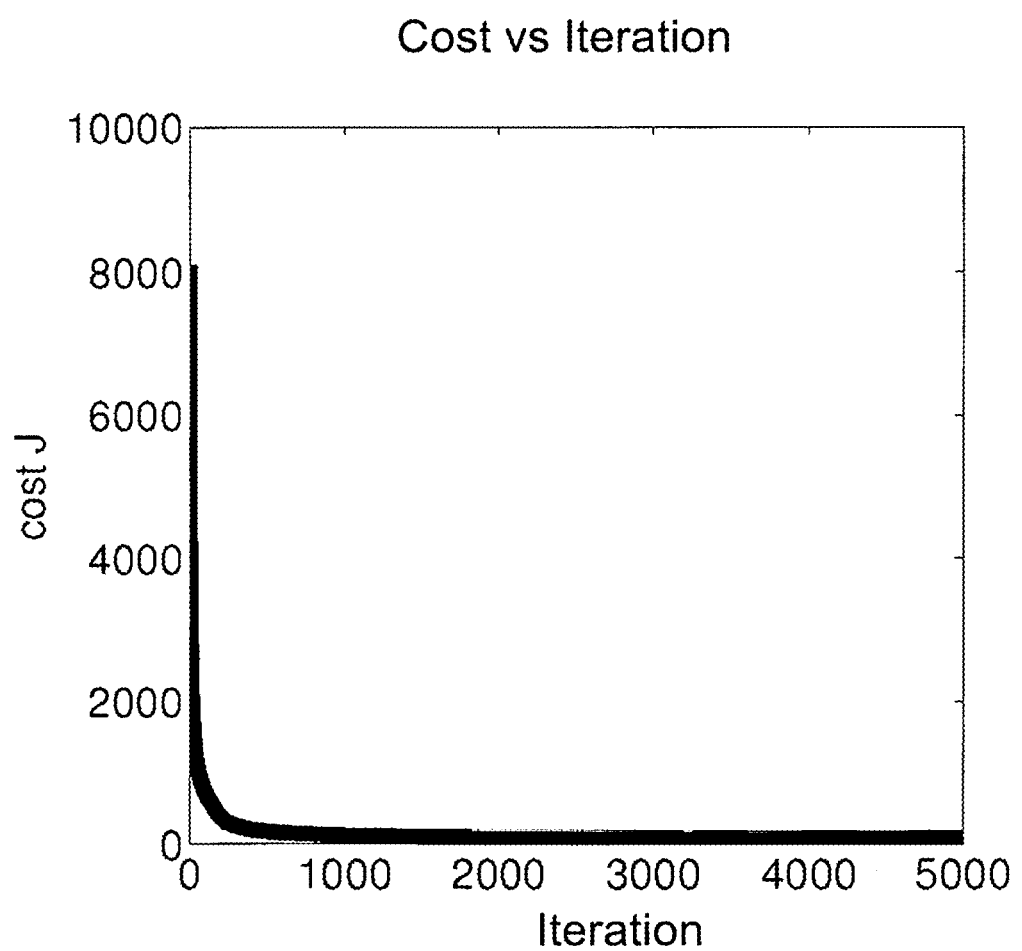
FIG. 13 illustrates a convergence of cost J after running steepest descent for 5000 iterations in accordance with one aspect of the disclosed technology.

A variant of the standard steepest descent with Armijo step size algorithm may be used to stochastically take turns optimizing the parameterized modes with high probability and switch times with low probability to drive the cost J to a local minimum. FIG. 13 illustrates the convergence of the cost J after a run of 5000 iterations.

3.5 Other Embodiments

Figure 15:
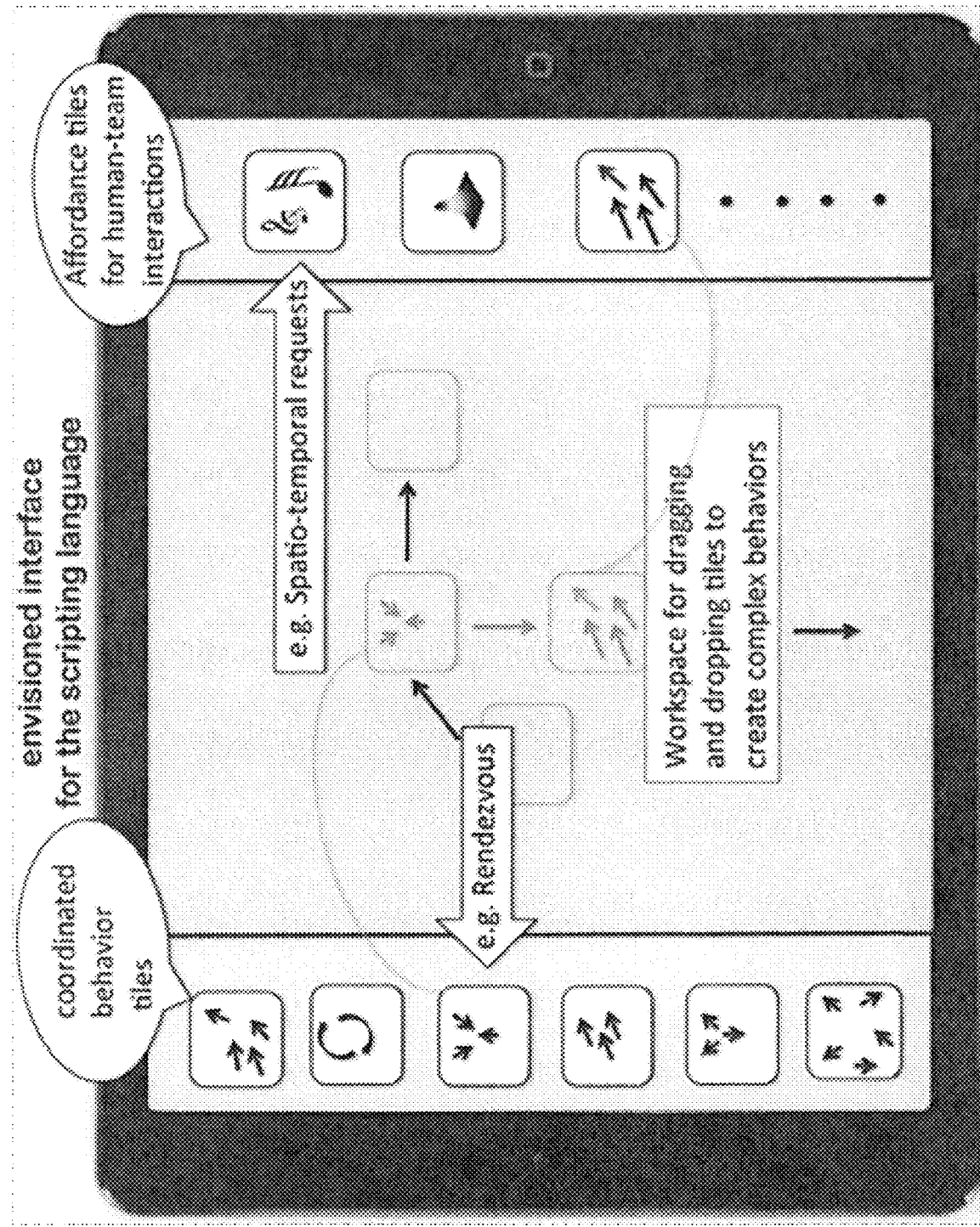
FIG. 15 illustrates an envisioned interface for the scripting language in accordance with one aspect of the disclosed technology.

FIG. 14 illustrates a pictorial example of scripting language in accordance with one aspect of the disclosed technology. FIG. 15 illustrates an envisioned interface for the scripting language in accordance with one aspect of the disclosed technology.

Figure 16:
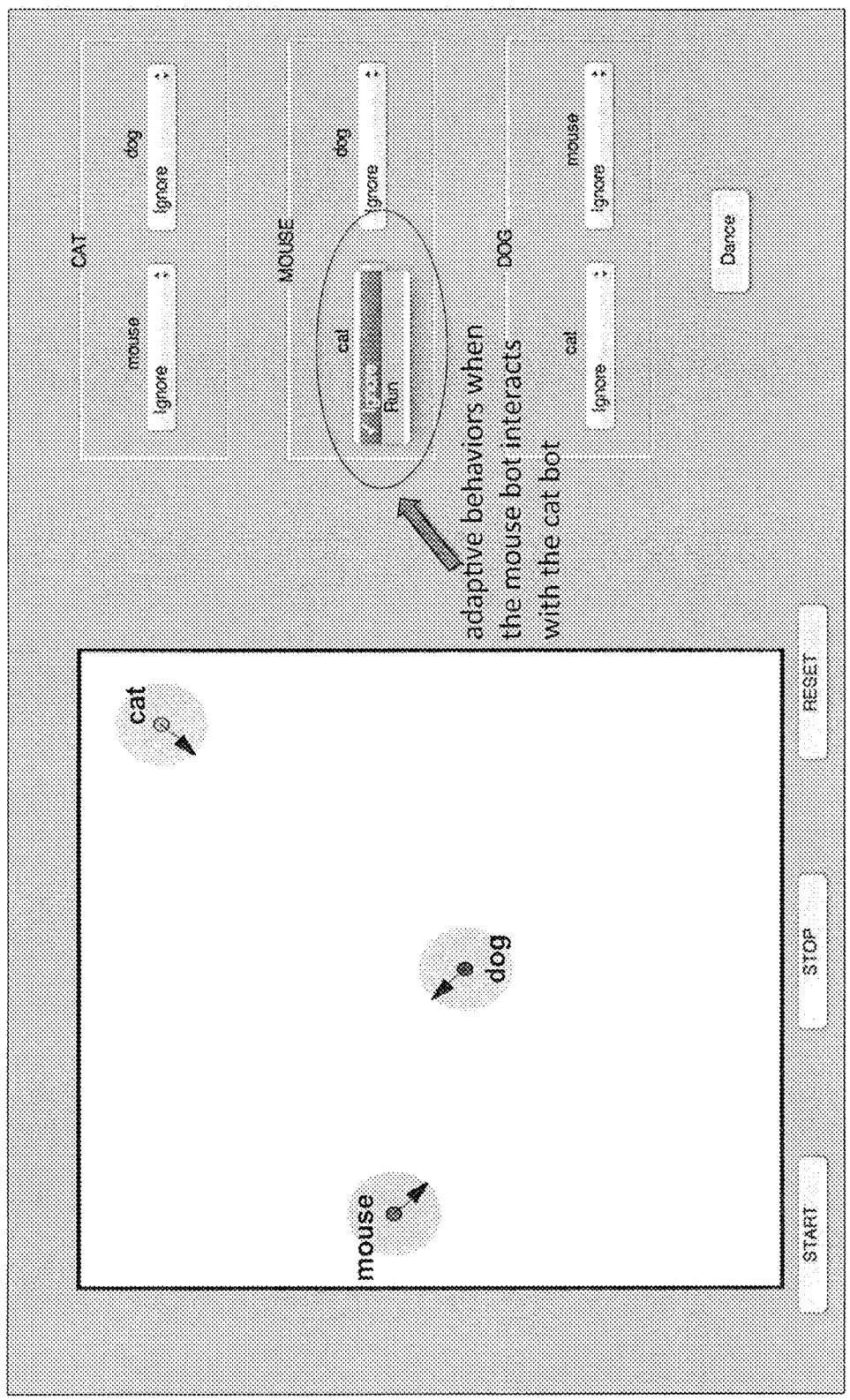
FIG. 16 illustrates a graphical user interface for controlling three robots in accordance with one aspect of the disclosed technology.

FIG. 16 illustrates a graphical user interface for controlling three robots in accordance with one aspect of the disclosed technology.

4. Advantages

The multi-robot systems and its methods described herein may outperform the previously known systems and methods. In one aspect, the general time-varying density functions may allow multi-robot optimal coverage, and may allow convergence to local minima. This algorithm is well-posed, and may allow for distributed implementation, and thus may perform better than previously known algorithms The present technology may be adapted to many applications, including but not limited to search and rescue, surveillance, exploration of frontier, agriculture, disaster field, manufacturing plants, defense and national security to detect and clear threats, and any other military operations. For example, optimal coverage of density functions may be applied to multi-robot search and rescue scenarios, where the density function may represent the probability of a lost person being at a certain point in an area. Additionally, optimal coverage of density functions may be applied to multi-robot surveillance and exploration, where the density function may be modeled to be a function of the explored "frontier."

By way of another example, optimal coverage of destiny functions may be applied to multi-robot farming Teams of smaller, more agile robots may work in swarms to perform a host of framing functions, without the downside of large tractors that compact the soil and devour gas. Swarm robots may tend crops on a micro level, inspecting individual plants for moisture and insects, and make decisions based on what they find, such as watering or administering pesticides. Farmers may control and communicate with the robots using nothing more than iPad app. Robots may operate autonomously and continuously over a full crop-growing cycle.

Numerous characteristics and advantages have been set forth in the foregoing description, together with details of structure and function. While the invention has been disclosed in several forms, it will be apparent to those skilled in the art that many modifications, additions, and deletions, especially in matters of shape, size, and arrangement of parts, can be made therein without departing from the spirit and scope of the invention and its equivalents as set forth in the following claims. Therefore, other modifications or embodiments as may be suggested by the teachings herein are particularly reserved as they fall within the breadth and scope of the claims here appended. The term "exemplary" used herein does not mean best mode, but rather, example.

Accordingly, those skilled in the art will appreciate that the conception upon which the application and claims are based may be readily utilized as a basis for the design of other structures, methods, and systems for carrying out the several purposes of the embodiments and claims disclosed in this application. It is important, therefore, that the claims be regarded as including such equivalent constructions.

Furthermore, the purpose of the foregoing Abstract is to enable the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way.

The invention claimed is:

1. A multi-robot system comprising:
    mobile robots; and
    a touchable screen that outputs a time-varying density function in response to a touch on the touchable screen and determines the time-varying density function based on a position and amount of the touch on the touchable screen;
    wherein the mobile robots are responsive to the time-varying density function indicative of an area of importance defined at the touchable screen in a dynamically changing domain of interest;
    wherein the mobile robots are configured to spread into the dynamically changing domain of interest; and
    wherein each robot includes:
        a sensor for detecting relative distance and angle measurements of an adjacent robot; and
        a processor, coupled to the sensor, the processor configured to:
            receive, from the sensor, data representative of the relative distance and angle measurements of the adjacent robot;
            determine a displacement vector relative to the adjacent robot based on the relative distance and angle measurements detected by the sensor; and
            calculate a velocity vector based on the time-varying density function.

2. The multi-robot system of claim 1, wherein each robot further comprises a memory storing data representative of the dynamically changing domain of interest; and
    wherein the processor is further configured to:
        receive data representative of the time-varying density function indicative of the area of importance in the dynamically changing domain of interest;
        calculate the velocity vector based on both the time-varying density function and the displacement vector relative to the adjacent robot; and
        output for moving the robot to the area of importance in the dynamically changing domain of interest based on the velocity vector.

3. The multi-robot system of claim 2, wherein the dynamically changing domain of interest is divided based on the Voronoi cell partition, and each robot occupies a Voronoi cell.

4. The multi-robot system of claim 3, wherein the processor is further configured to compute a change in the robot's Voronoi cell, and a change in the adjacent robot's Voronoi cell.

5. The multi-robot system of claim 4, wherein the processor is further configured to calculate the velocity vector to compensate for the changes.

6. The multi-robot system of claim 2, wherein the processor is further configured to receive the data representative of the time-varying density function from the touchable screen.

7. A method for controlling a multi-robot system comprising robots, wherein the robots are responsive to a time-varying density function indicative of an area of importance in a dynamically changing domain of interest, and wherein each robot includes a sensor and a processor, the method comprising:
- receiving, by the processor on each robot, from the sensor, data representative of the relative distance and angle measurements of the adjacent robot;
- determining, by the processor, a displacement vector relative to the adjacent robot based on the relative distance and angle measurements detected by the sensor;
- receiving data representative of the time-varying density function from a computing device having a touch screen;
- determining the time-varying density function based on a position and amount of a touch on the touch screen;
- calculating a velocity vector based on the time-varying density function and the displacement vector relative to the adjacent robot; and
- outputting for moving the robot to the area of importance in the dynamically changing domain of interest based on the velocity vector;
- wherein the robots are configured to spread into the dynamically changing domain of interest.

8. A multi-robot system comprising mobile robots;
- wherein the robots are responsive to a density function indicative of an area of importance in a dynamically changing domain of interest;
- wherein the robots together perform a sequence of formations in a decentralizing manner, each robot mimicking a trajectory as part of its performance, each robot mimicking the trajectory by switching among motion modes; and
- wherein each robot includes:
  - a sensor for detecting relative distance and angle measurements of an adjacent robot; and
  - a processor, coupled to the sensor, the processor configured to:
    - receive, from the sensor, data representative of the relative distance and angle measurements of the adjacent robot;
    - determine a displacement vector relative to the adjacent robot based on the relative distance and angle measurements detected by the sensor;
    - receive data representative of the sequence of formations;
    - determine a scaling factor for the robot's next mode based on the displacement vector;
    - determine a rotation factor for the robot's next mode based on the displacement vector;
    - determine a switch time for the robot's next mode based on the displacement vector; and
    - output for executing the next mode based on the scaling factor, the rotation factor and the switch time.

9. The multi-robot system of claim 8, wherein the processor is further configured to optimize the scaling factor, rotation factor and switch time based on an optimality condition and a costate equation.

10. The multi-robot system of claim 8, wherein the processor is further configured to optimize the scaling factor, rotation factor and switch time by performing a steepest decent algorithm.

11. The multi-robot system of claim 8, wherein the scaling factor scales the displacement vector by multiplying a relative distance measurement between two adjacent robots by a constant.

12. The multi-robot system of claim 8, wherein the rotating factor rotates the displacement vector by adding a constant to a relative angle measurement.

13. A method for controlling the multi-robot system of claim 8 comprising:
- receiving, by the processor on each robot, the data representative of the sequence of formations in a decentralizing manner;
- receiving, by the processor, from the sensor, data representative of relative distance and angle measurements between the robot and its adjacent robot;
- determining, by the processor, the displacement vector relative to the adjacent robot based on the relative distance and angle measurements;
- determining the scaling factor for the robot's next mode based on the displacement vector;
- determining the rotation factor for the robot's next mode based on the displacement vector;
- determining the switch time for the robot's next mode based on the displacement vector; and outputting for executing the next mode based on the scaling factor, the rotation factor and the switch time;
- wherein the robots perform the sequence of formations in a decentralizing manner.

14. The method of claim 13 further comprising optimizing the scaling factor, rotation factor and switch time based on an optimality condition and a costate equation.

15. The method of claim 13 further comprising optimizing the scaling factor, rotation factor and switch time by performing a steepest decent algorithm.

16. The method of claim 13 further comprising scaling with the scaling factor the displacement vector by multiplying a relative distance measurement between two adjacent robots by a constant.

17. The method of claim 13 further comprising rotating with the rotating factor the displacement vector by adding a constant to a relative angle measurement.

18. The multi-robot system of claim 8, wherein the processor is further configured to receive data representative of the density function from an interface.

19. The multi-robot system of claim 8 further comprising an interface;
- wherein the mobile robots are configured to spread into the dynamically changing domain of interest; and
- wherein the interface comprises a touchable screen that outputs the density function in response to a touch on the touchable screen, and determines the density function based on a position and amount of the touch on the touchable screen.

* * * * *